United States Patent
Khan et al.

(10) Patent No.: US 11,586,695 B2
(45) Date of Patent: Feb. 21, 2023

(54) ITERATING BETWEEN A GRAPHICAL USER INTERFACE AND PLAIN-TEXT CODE FOR DATA VISUALIZATION

(71) Applicant: Elasticsearch B.V., Mountain View, CA (US)

(72) Inventors: Rashid Khan, Phoenix, AZ (US); Joseph Fleming, Chandler, AZ (US)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 15/907,274

(22) Filed: Feb. 27, 2018

(65) Prior Publication Data
US 2019/0265853 A1 Aug. 29, 2019

(51) Int. Cl.
| | |
|---|---|
| *G06F 16/9538* | (2019.01) |
| *G06F 3/0484* | (2022.01) |
| *G06F 8/41* | (2018.01) |
| *G06F 16/248* | (2019.01) |
| *G06F 16/951* | (2019.01) |
| *G06F 40/211* | (2020.01) |

(52) U.S. Cl.
CPC ........ *G06F 16/9538* (2019.01); *G06F 3/0484* (2013.01); *G06F 8/427* (2013.01); *G06F 16/248* (2019.01); *G06F 16/951* (2019.01); *G06F 40/211* (2020.01)

(58) Field of Classification Search
CPC .... G06F 3/0484; G06F 16/951; G06F 16/248; G06F 8/427; G06F 17/271
USPC ......................................................... 715/762
See application file for complete search history.

(56) References Cited

U.S. PATENT DOCUMENTS

| | | | |
|---|---|---|---|
| 5,481,741 A * | 1/1996 | McKaskle | G06F 8/34 358/1.9 |
| 6,102,965 A * | 8/2000 | Dye | G05B 19/0426 717/109 |
| 6,157,934 A | 12/2000 | Khan et al. | |
| 6,243,710 B1 | 6/2001 | DeMichiel et al. | |
| 6,437,805 B1 * | 8/2002 | Sojoodi | G06F 8/34 717/105 |
| 7,043,534 B1 * | 5/2006 | Donnelly | H04L 67/10 709/203 |
| 7,444,584 B1 | 10/2008 | Hobbs | |
| 7,865,525 B1 | 1/2011 | Lusk et al. | |
| 7,870,492 B2 | 1/2011 | Mukundan et al. | |

(Continued)

OTHER PUBLICATIONS

Publish webservice locally without separate hosting, Mar. 7, 2011, Blogspot (http://ransandeep.blogspot.com/2011/03/publish-webservice-locally-without-iis.html) (Year: 2011).*

(Continued)

*Primary Examiner* — Sherief Badawi
*Assistant Examiner* — Koorosh Nehchiri
(74) *Attorney, Agent, or Firm* — Quinn IP Law

(57) ABSTRACT

Systems and methods for iterating between a graphical user interface and an expression for data visualization. Exemplary methods include: receiving an edited expression from a user, the edited expression including changes to the expression and being associated with a component; evaluating the edited expression; displaying the component using the evaluation of the edited expression; determining a user interface block using the edited expression; and presenting the user interface block to the user in a graphical user interface.

14 Claims, 33 Drawing Sheets

(56) References Cited

U.S. PATENT DOCUMENTS

| | | | |
|---|---|---|---|
| 9,201,924 B1* | 12/2015 | Fuller | G06F 16/24542 |
| 9,384,203 B1 | 7/2016 | Seiver et al. | |
| 9,430,194 B1* | 8/2016 | Childs | G06F 8/33 |
| 9,524,323 B2* | 12/2016 | Meek | G06F 8/427 |
| 10,162,613 B1* | 12/2018 | Vilozny | G06F 8/427 |
| 10,489,122 B1* | 11/2019 | Abbott | G06F 8/34 |
| 10,657,317 B2 | 5/2020 | Khan et al. | |
| 10,997,196 B2 | 5/2021 | Tong | |
| 2001/0020291 A1* | 9/2001 | Kudukoli | G06F 8/34 |
| | | | 717/100 |
| 2001/0027462 A1 | 10/2001 | Muramatsu | |
| 2003/0233404 A1* | 12/2003 | Hopkins | G06F 3/0484 |
| | | | 709/203 |
| 2004/0148592 A1 | 7/2004 | Vion-Dury | |
| 2004/0158812 A1* | 8/2004 | Dye | G06F 8/34 |
| | | | 717/105 |
| 2005/0107998 A1* | 5/2005 | McLernon | G06F 8/34 |
| | | | 703/22 |
| 2005/0165900 A1 | 7/2005 | Bodin et al. | |
| 2005/0192756 A1 | 9/2005 | Varpela et al. | |
| 2008/0022264 A1* | 1/2008 | Macklem | G06F 8/34 |
| | | | 717/136 |
| 2008/0147671 A1* | 6/2008 | Simon | G06F 16/957 |
| 2009/0077047 A1* | 3/2009 | Cooper | G06F 17/2785 |
| 2009/0100360 A1* | 4/2009 | Janzen | G06F 40/18 |
| | | | 715/764 |
| 2009/0217302 A1* | 8/2009 | Grechanik | G06F 11/368 |
| | | | 719/320 |
| 2009/0327468 A1 | 12/2009 | Hirsch et al. | |
| 2010/0153933 A1* | 6/2010 | Bohlmann | G06F 8/73 |
| | | | 717/144 |
| 2011/0029933 A1 | 2/2011 | Chu et al. | |
| 2011/0225195 A1 | 9/2011 | Kubicki et al. | |
| 2012/0011458 A1* | 1/2012 | Xia | G06F 3/04847 |
| | | | 715/771 |
| 2012/0084301 A1 | 4/2012 | Sarnowicz et al. | |
| 2012/0239420 A1 | 9/2012 | Stapelfeldt et al. | |
| 2012/0253791 A1* | 10/2012 | Heck | G06F 16/9535 |
| | | | 704/9 |
| 2012/0284685 A1* | 11/2012 | Winternitz | G06F 9/44536 |
| | | | 717/104 |
| 2012/0304156 A1* | 11/2012 | Feiveson | G06F 11/3636 |
| | | | 717/131 |
| 2013/0073994 A1* | 3/2013 | Liao | G06Q 10/06 |
| | | | 715/762 |
| 2013/0346895 A1* | 12/2013 | Selgas | H04L 29/06 |
| | | | 715/765 |
| 2014/0067755 A1 | 3/2014 | Ishimoto et al. | |
| 2014/0101290 A1* | 4/2014 | Johnston | G06F 16/83 |
| | | | 709/219 |
| 2014/0149399 A1* | 5/2014 | Kurzion | G06F 16/9535 |
| | | | 707/723 |
| 2014/0173563 A1* | 6/2014 | Dias | G06F 8/74 |
| | | | 717/123 |
| 2014/0280952 A1 | 9/2014 | Shear et al. | |
| 2014/0297725 A1* | 10/2014 | Biron, III | G06F 9/45512 |
| | | | 709/203 |
| 2014/0324778 A1 | 10/2014 | Bonnell et al. | |
| 2015/0058327 A1 | 2/2015 | Frank et al. | |
| 2015/0058745 A1* | 2/2015 | Torgerson | G06F 3/01 |
| | | | 715/747 |
| 2015/0222730 A1 | 8/2015 | Gower et al. | |
| 2015/0244783 A1* | 8/2015 | Mayers | H04L 67/10 |
| | | | 709/203 |
| 2015/0324440 A1* | 11/2015 | Subramanian | G06F 16/3338 |
| | | | 707/694 |
| 2016/0232537 A1 | 8/2016 | Nonez et al. | |
| 2016/0291942 A1* | 10/2016 | Hutchison | G06F 8/451 |
| 2017/0124220 A1 | 5/2017 | Krueger et al. | |
| 2017/0161390 A1 | 6/2017 | Kavas | |
| 2017/0270572 A1 | 9/2017 | Schydlowsky | |
| 2018/0005427 A1* | 1/2018 | Marvie | G06T 1/20 |
| 2018/0032316 A1 | 2/2018 | Dinga et al. | |
| 2018/0129746 A1 | 5/2018 | Zhu et al. | |
| 2018/0181657 A1 | 6/2018 | Giardina et al. | |
| 2018/0278725 A1 | 9/2018 | Thayer | |
| 2018/0341956 A1 | 11/2018 | Everhart et al. | |
| 2018/0375745 A1 | 12/2018 | Balupari | |
| 2019/0266232 A1 | 8/2019 | Khan et al. | |
| 2020/0134077 A1 | 4/2020 | Tong | |
| 2021/0263950 A1 | 8/2021 | Tong | |

OTHER PUBLICATIONS

Create and consume web service on local machine by using WAMP, Oct. 7, 2013, stackoverflow.com (https://stackoverflow.com/questions/19423590/create-and-consume-web-service-on-local-machine-by-using-wamp/19423980) (Year: 2013).*

How does Visual Studio run a web service locally? , Feb. 6, 2012, stackoverflow.com (https://stackoverflow.com/questions/9157068/how-does-visual-studio-run-a-web-service-locally) (Year: 2012).*

Jolicode, "Using Rollup to merge old logs with Elasticsearch 6.3", Retrieved on Jul. 11, 2018; Retrieved from the Internet: <https://web.archive.org/web/20180711144714/https://jolicode.com/blog/using-rollup-to-merge-old-logs-with-elasticsearch-6-3>; 8 pages.

* cited by examiner

300

310 → esdocs fields=bytes,@timestamp

320 → | staticColumn column=total value={math 'sum(bytes)'}

| sleep 500 ← 330

340 → | mapColumns column=@timestamp, fn=${getColumn @timestamp

350 → | rounddate 'YYYY-MM-DD'}

FIG. 3

ITERATING BETWEEN A GRAPHICAL USER INTERFACE AND PLAIN-TEXT CODE FOR DATA VISUALIZATION

CROSS REFERENCE TO RELATED APPLICATION

This application is related to application Ser. No. 15/907,280, filed Feb. 27, 2018, the disclosure of which is hereby incorporated by reference.

TECHNICAL FIELD

The present technology relates generally to search engines and more specifically to data visualization.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A search engine is an information retrieval system designed to help find information stored on a computer system. Search engines help to minimize the time required to find information and the amount of information that is checked. Data visualization concerns communicating information clearly and efficiently using statistical graphics, plots, and information graphics. Numerical data can be encoded using dots, lines, or bars, to visually communicate quantitative information.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for iterating between a graphical user interface and an expression for data visualization. Specifically, a method may comprise: receiving an edited expression from a user, the edited expression including changes to the expression and being associated with a component; evaluating the edited expression; displaying the component using the evaluation of the edited expression; determining a user interface block using the edited expression; and presenting the user interface block to the user in a graphical user interface.

BRIEF DESCRIPTION OF THE DRAWINGS

Embodiments are illustrated by way of example, and not by limitation, in the figures of the accompanying drawings, in which like references indicate similar elements and in which:

FIG. 3 depicts an example expression, in accordance with some embodiments.

DETAILED DESCRIPTION

Figure 1:
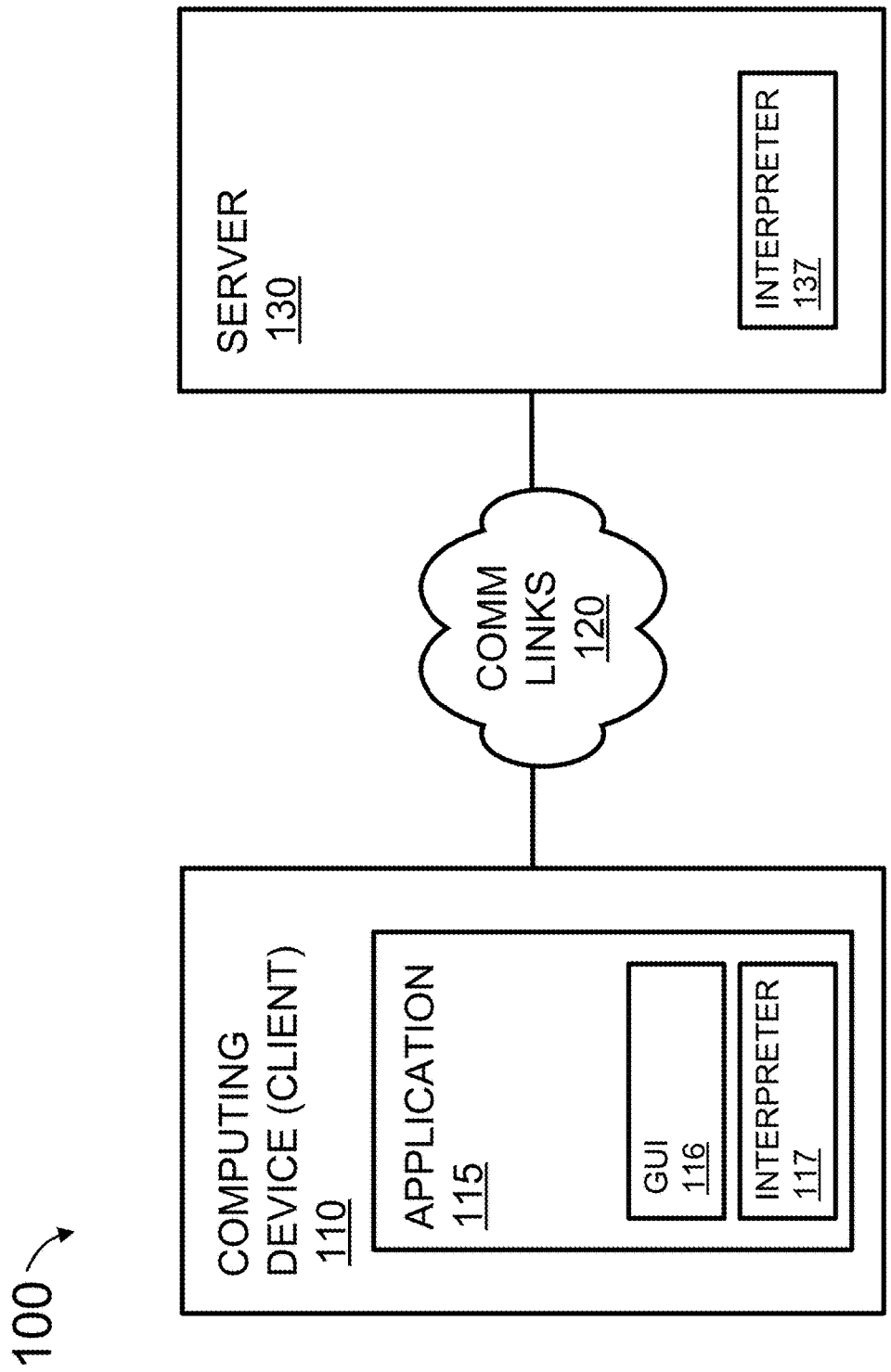
FIG. 1 is a simplified representation of a system for iterating between a graphical user interface and an expression for data visualization, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 illustrates system 100 for data visualization according to some embodiments. System 100 can include client 110, communications links 120, and server 130. Client 110 can include application 115. Application 115 can provide visualization capabilities on top of content (data) stored on server 130. Application 115 can be a standalone computer program, a plug-in (e.g., software component that adds a specific feature to an existing computer program) such as for a web browser, and the like. A web browser can be a computer program for retrieving, presenting, and traversing information resources on the World Wide Web, web servers in private networks, files in file systems, and the like, such as Mozilla Firefox, Google Chrome, Apple Safari, Microsoft Edge, and the like.

Application 115 can include graphical user interface (GUI) 116 and interpreter 117. GUI 116 can be a type of user interface that allows users to interact with application 115 through graphical icons, visual indicators, and menus. User actions in GUI 116 can be performed through manipulation of the graphical elements (e.g., using a mouse, touch pad, touch screen, etc.). Interpreter 117 can be a computer program (e.g., part of application 115) that directly executes (e.g., performs) instructions (e.g., expressions) written in a programming or scripting language, without requiring them to have been compiled earlier.

Client 110 can include input devices (e.g., mouse, keyboard, touch screen, etc.), output devices (e.g., display, speaker, etc.), one or more processors, memory, operating system (e.g., Microsoft Windows, Google Android, Apple macOS, Apple iOS, Linux, etc.), non-volatile storage (e.g., flash memory, hard disk, solid-state disk, etc.), wired and/or wireless communications interfaces (e.g., Ethernet, Wi-Fi, Bluetooth, mobile broadband, etc.), Global Positioning System (GPS) receiver, and the like (not shown in FIG. 1). Client 110 is described further in relation to FIG. 9.

Figure 9:
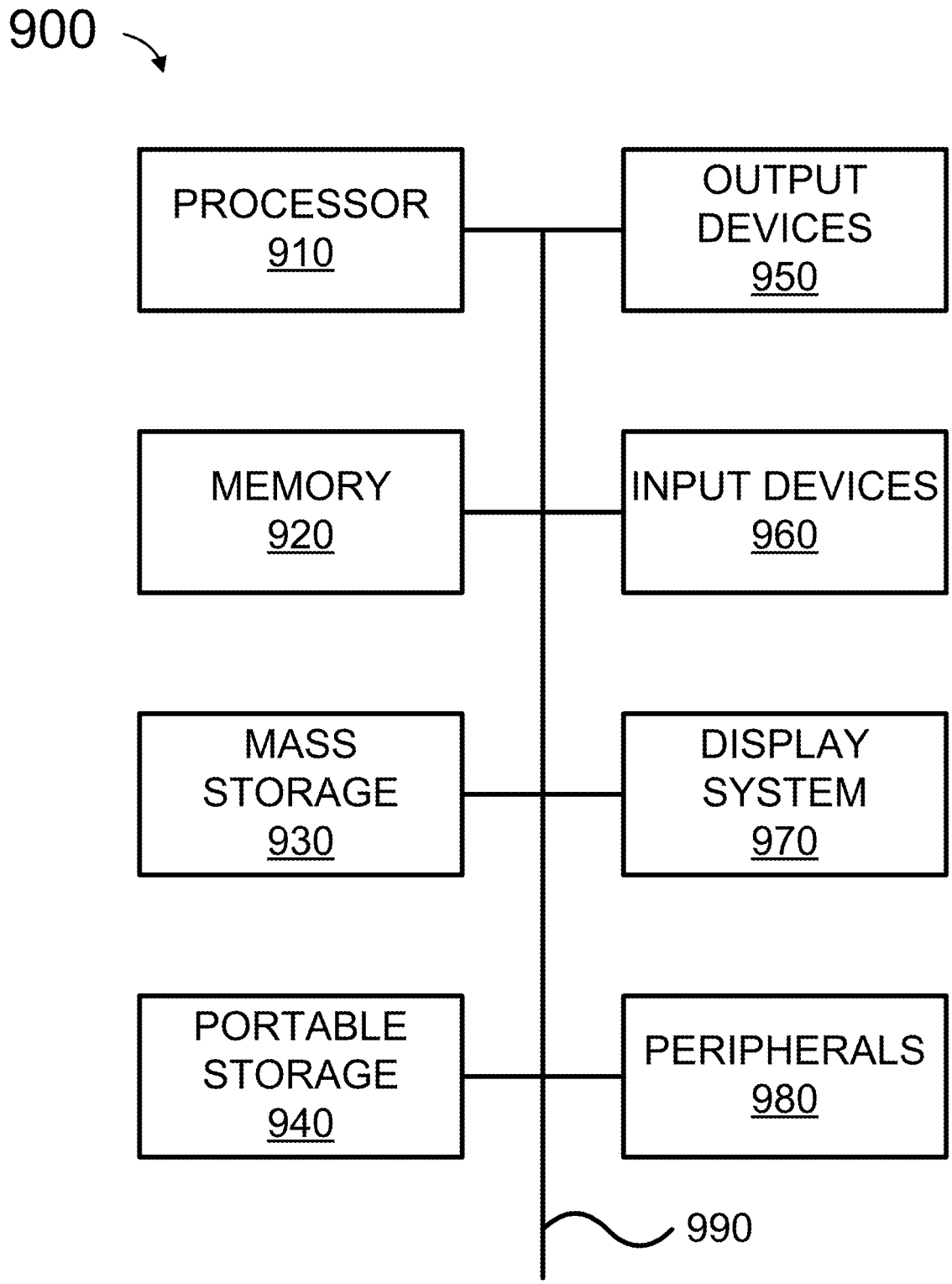
FIG. 9 is a simplified block diagram of a computing system, in accordance with various embodiments, according to some embodiments.

Communications links 120 can be various combinations and permutations of wired and wireless networks (e.g., Ethernet, Wi-Fi, Bluetooth, mobile broadband, the Internet, etc.), internal/external computer busses, and the like, such as described in relation to FIG. 9. Although depicted as a single "block," communications links 120 can be, for example, multiple distinct/separate combinations and permutations of wired and wireless networks, internal/external computer busses, and the like.

Server 130 can include interpreter 137. Interpreter 137 includes at least some of the characteristics of interpreter 117. The operation/functionality of interpreters 117 and 137 can overlap. In some embodiments, of interpreters 117 and 137 utilize the same program code (e.g., possibly compiled to run on different types of processors), but running in different locations (e.g., client and server).

In some embodiments, server 130 includes one or more hardware servers, virtual machines, containers, and the like. Server 130 can further include one or more physical storage devices (e.g., hard disks, solid-state disks, etc.), virtual storage devices, and the like for storing data. Constituents of server 130 can be disposed in the same and/or different locations (e.g., factories, data centers, cities, counties, geographic regions, countries, continents, etc.). Constituents of server 130 can be in a cloud computing environment. Constituents of server 130 can each include a communications link, such as a wired and/or wireless communications network (e.g., Ethernet, Wi-Fi, Bluetooth, mobile broadband, etc.) connection, radio, modem, network adapter, and the like, for communications with client 110. Server 130 is described further in relation FIG. 9.

Figure 2A:
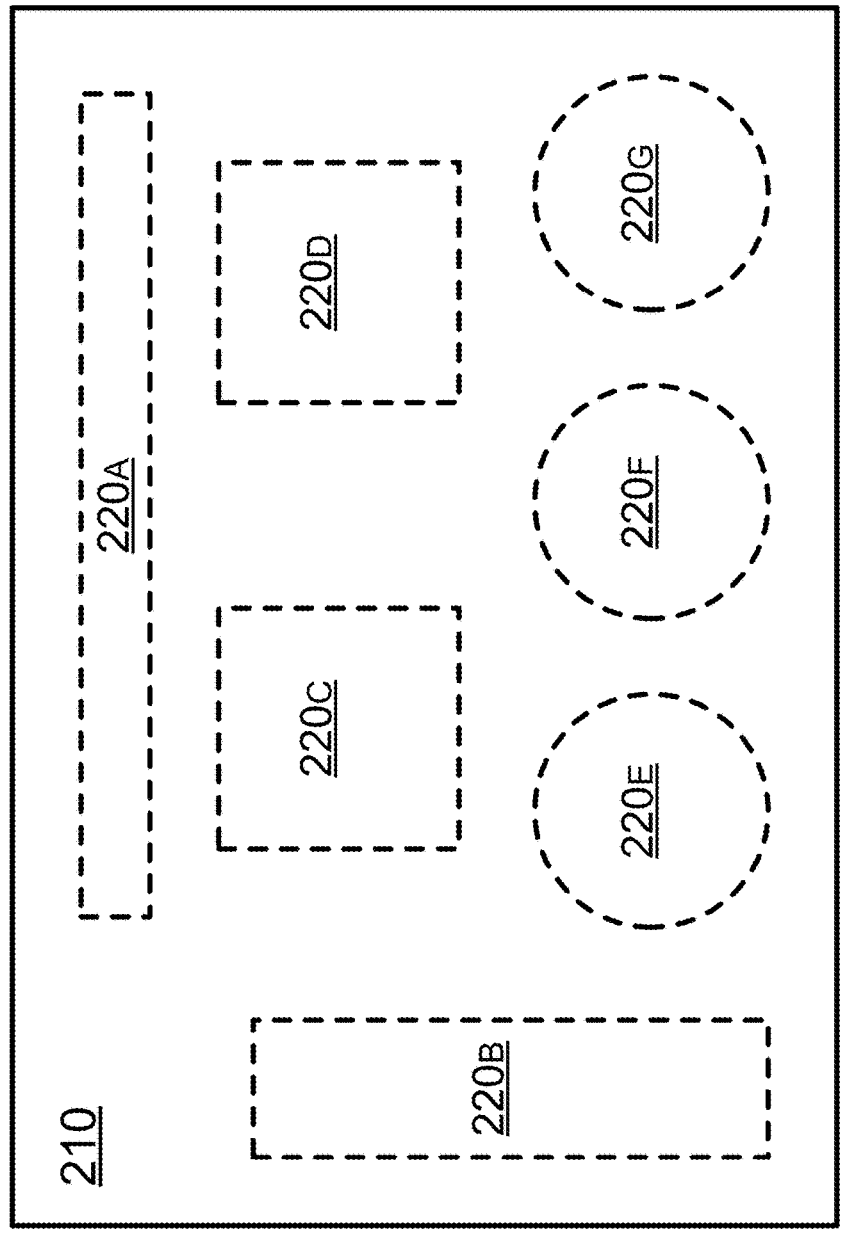
FIGS. 2A-Q illustrate various embodiments of the application of FIG. 1, according to various embodiments.

FIG. 2A shows application 115 in accordance with some embodiments. Application 115 offers (two-dimensional) space 210 (also called a workpad) on which components (also called elements) $220_A$-$220_G$ can be disposed (e.g., at the direction of a user using GUI 116 in FIG. 1). For example, a component of components $220_A$-$220_G$ can be added to space 210 by selecting a component type from a menu and placing onto space 210 (e.g., at the direction of a user using GUI 116). By way of further non-limiting example, components $220_A$-$220_G$ can each be combinations and permutations of images/graphics, text, charts (e.g., line plot, scatter plot, column chart, bar chart, pie chart, area chart, box plot, surface chart, doughnut chart, bubble chart, radar chart, etc.), drop down menu, search box, and the like. Although components $220_A$-$220_G$ depict seven components in space 210, any number of components in any arrangement can be used.

Application 115 can change (e.g., at the direction of a user using GUI 116 in FIG. 1) The style (appearance) of each component of components $220_A$-$220_G$, such as by resizing, rotating, changing colors (e.g., drawn from a provided palette), fonts, borders, and the like. Application 115 can further change (e.g., at the direction of a user using GUI 116) a data source of server 130 from which data for each component of components $220_A$-$220_G$ is drawn. In some embodiments, Application 115 draws data from a data source of server 130 for each component of components $220_A$-$220_G$ at the creation of each component of components $220_A$-$220_G$, on demand, at a fixed interval of time, at a variable interval of time, and the like. Although server 130 is described as having a data source, among other features, other data sources can be used (e.g., other external systems using an application programming interface (API)).

Figure 2B:
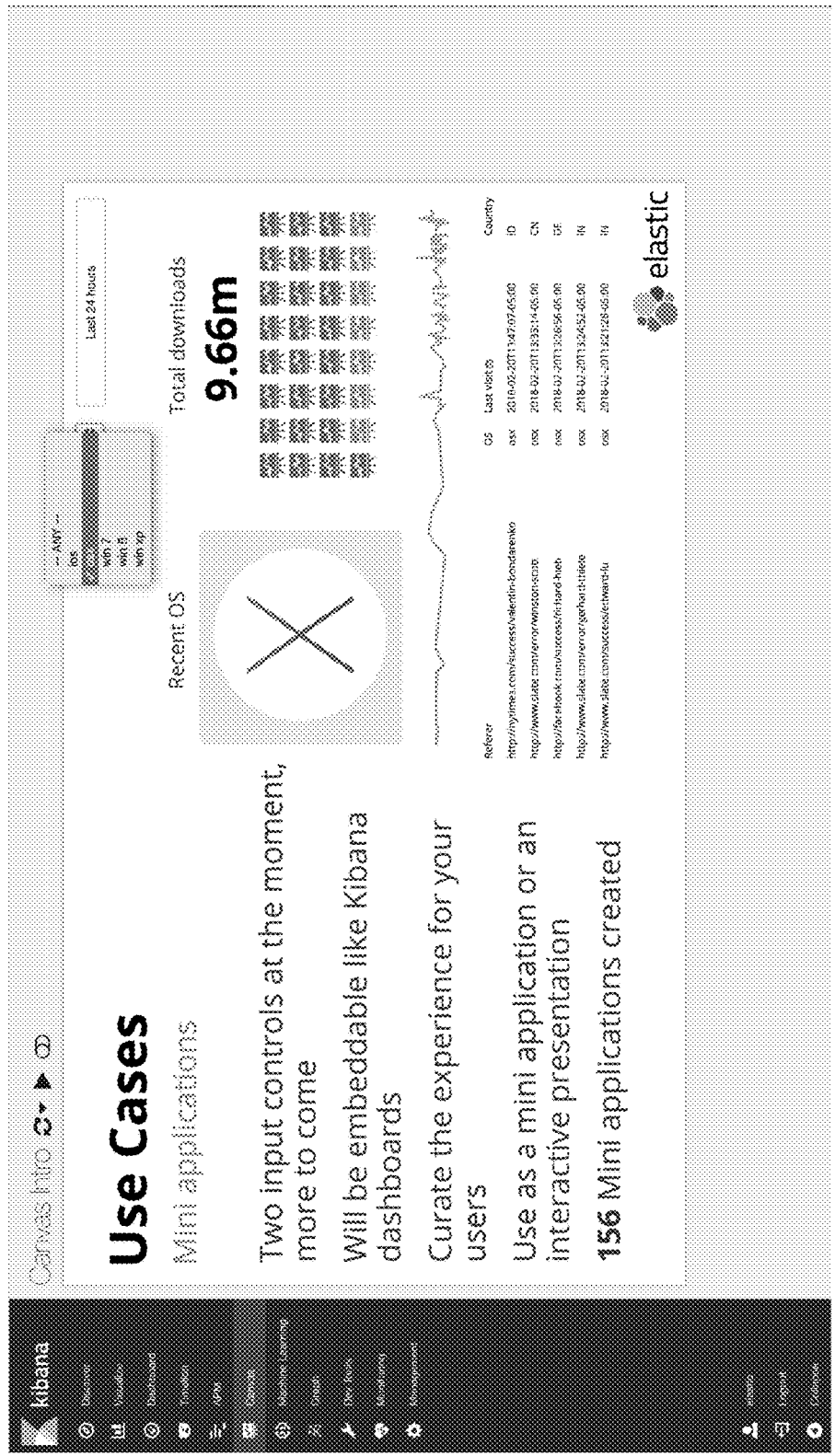
Figure 2C:
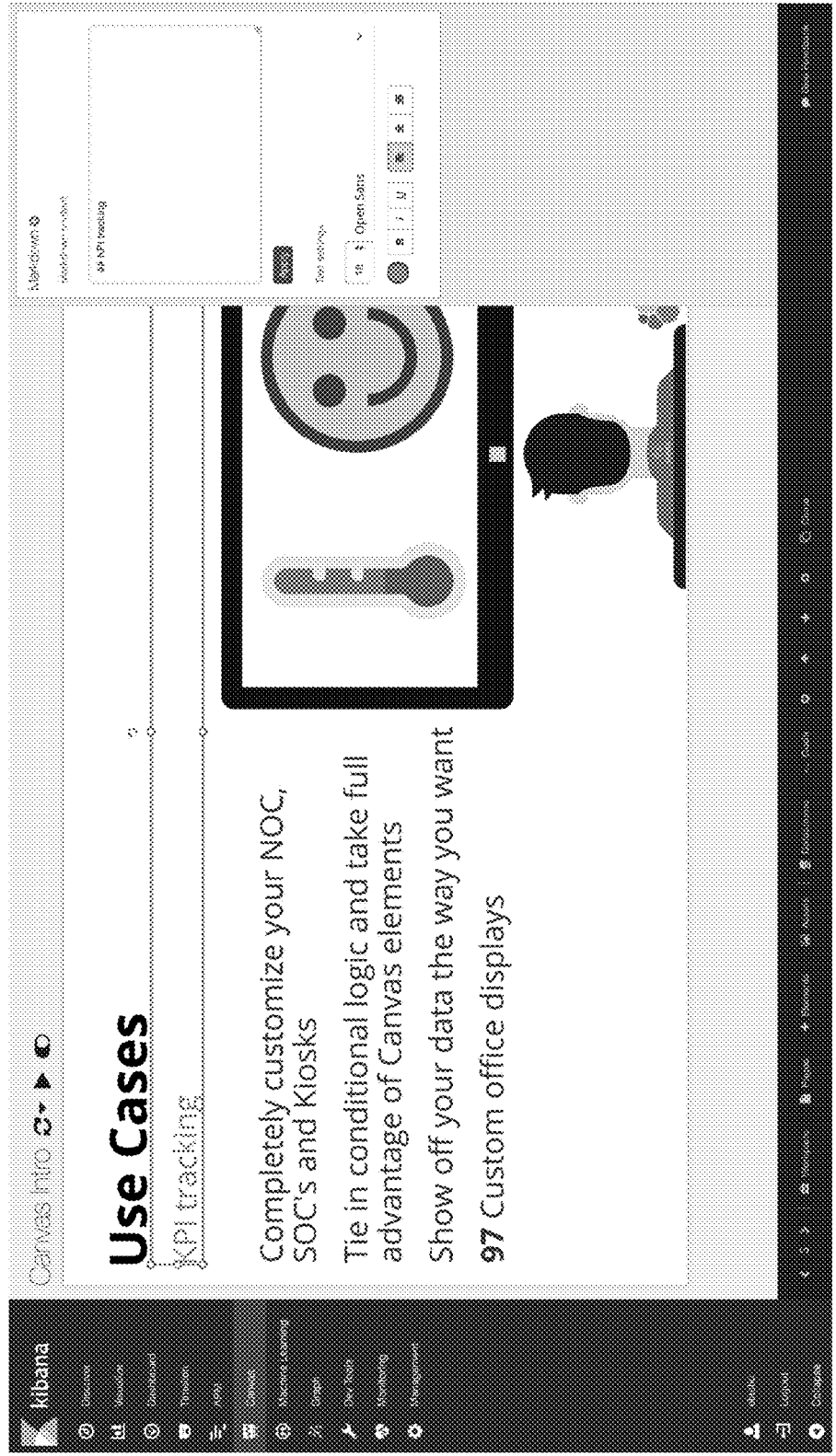
Figure 2D:
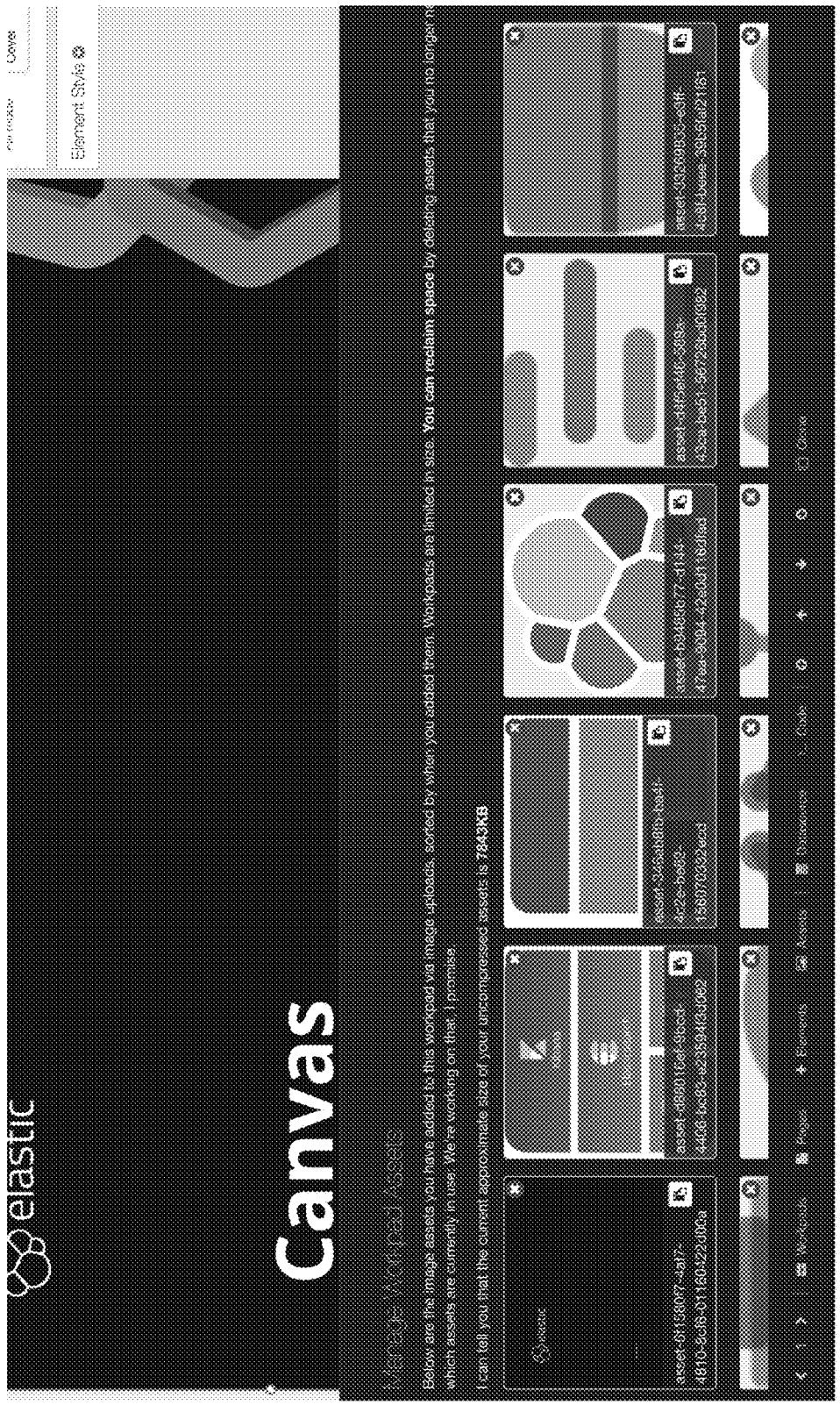
Figure 2E:
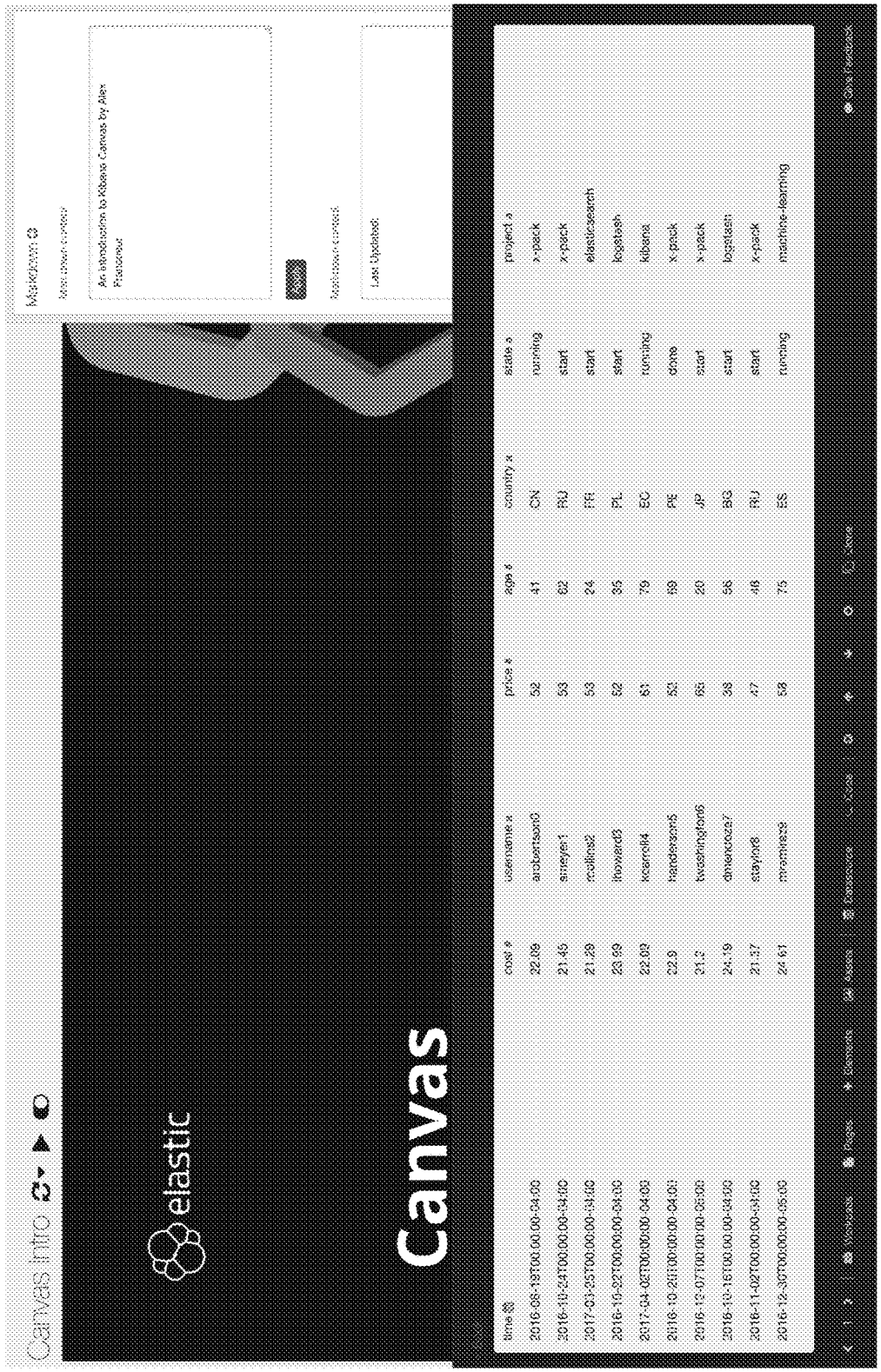
Figure 2F:
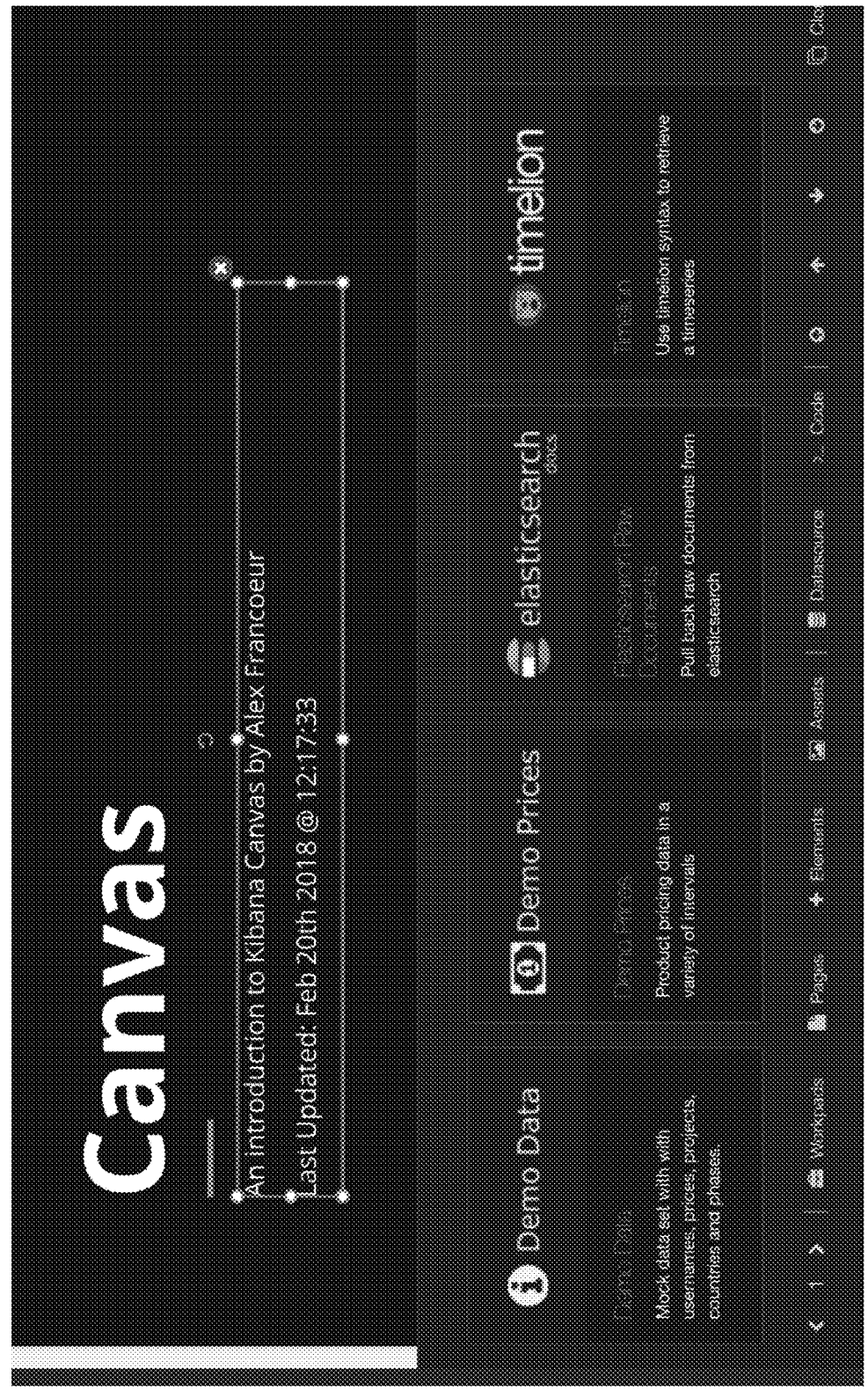
Figure 2G:
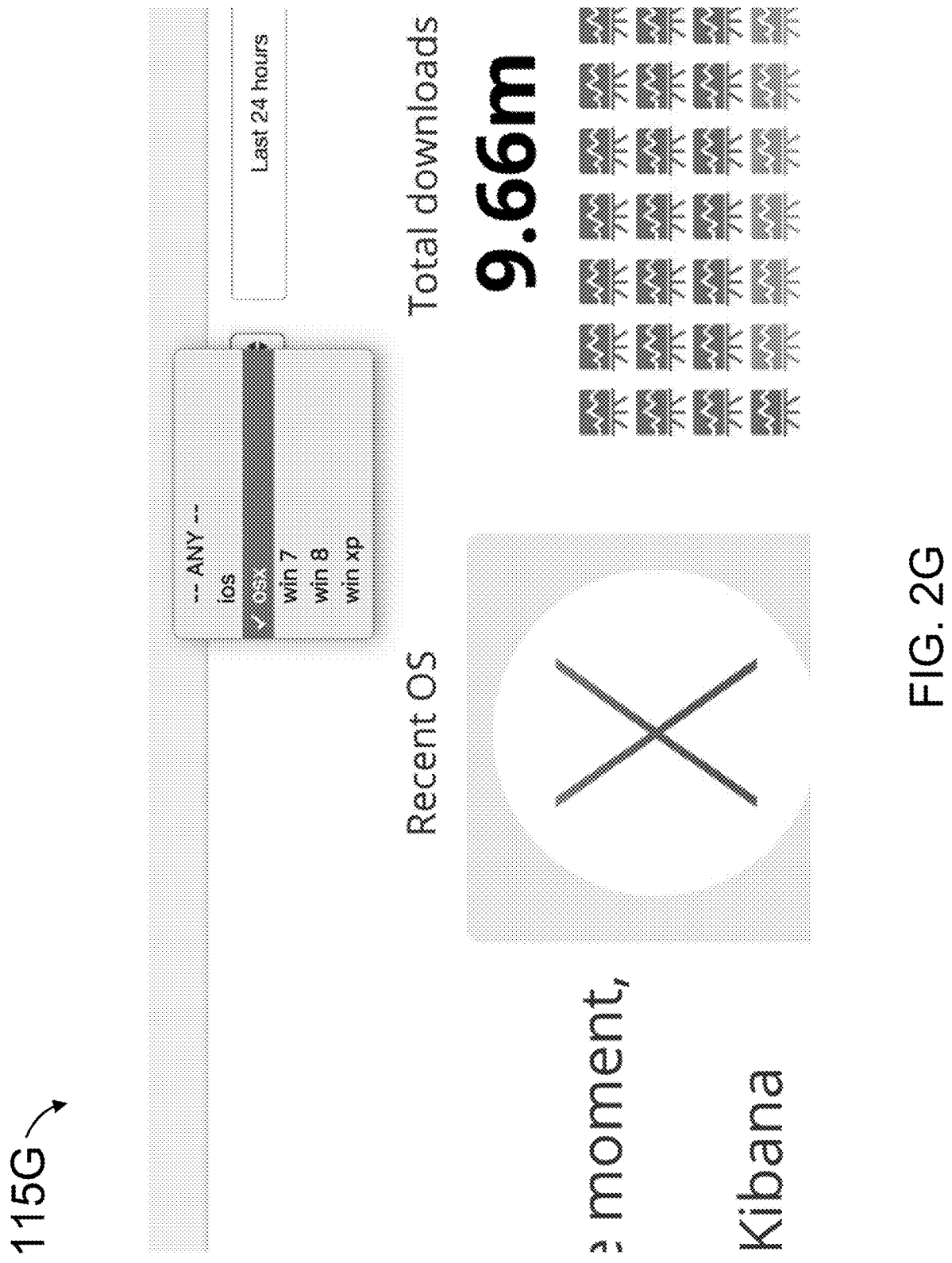
Figure 2H:
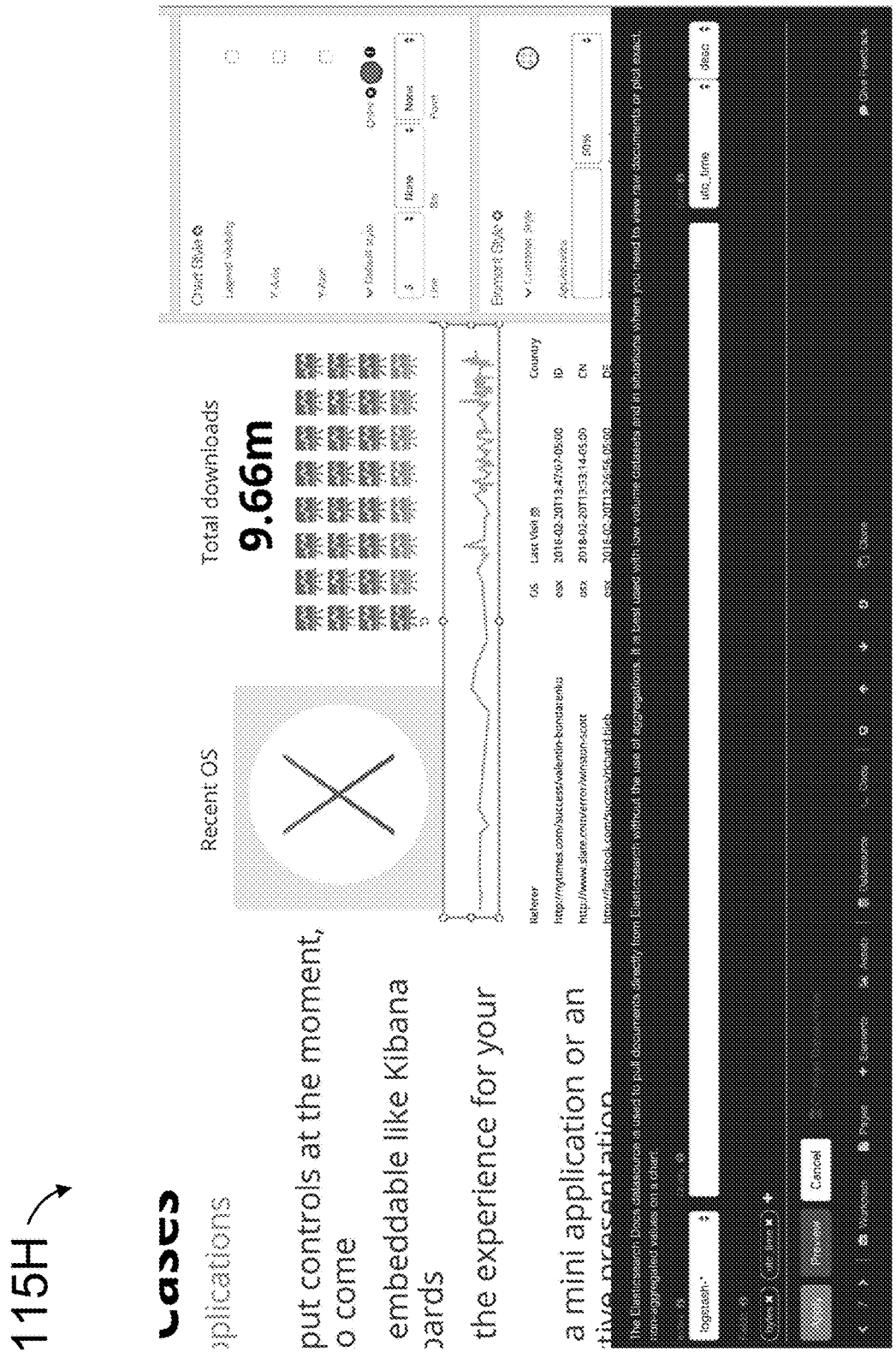
Figure 2I:
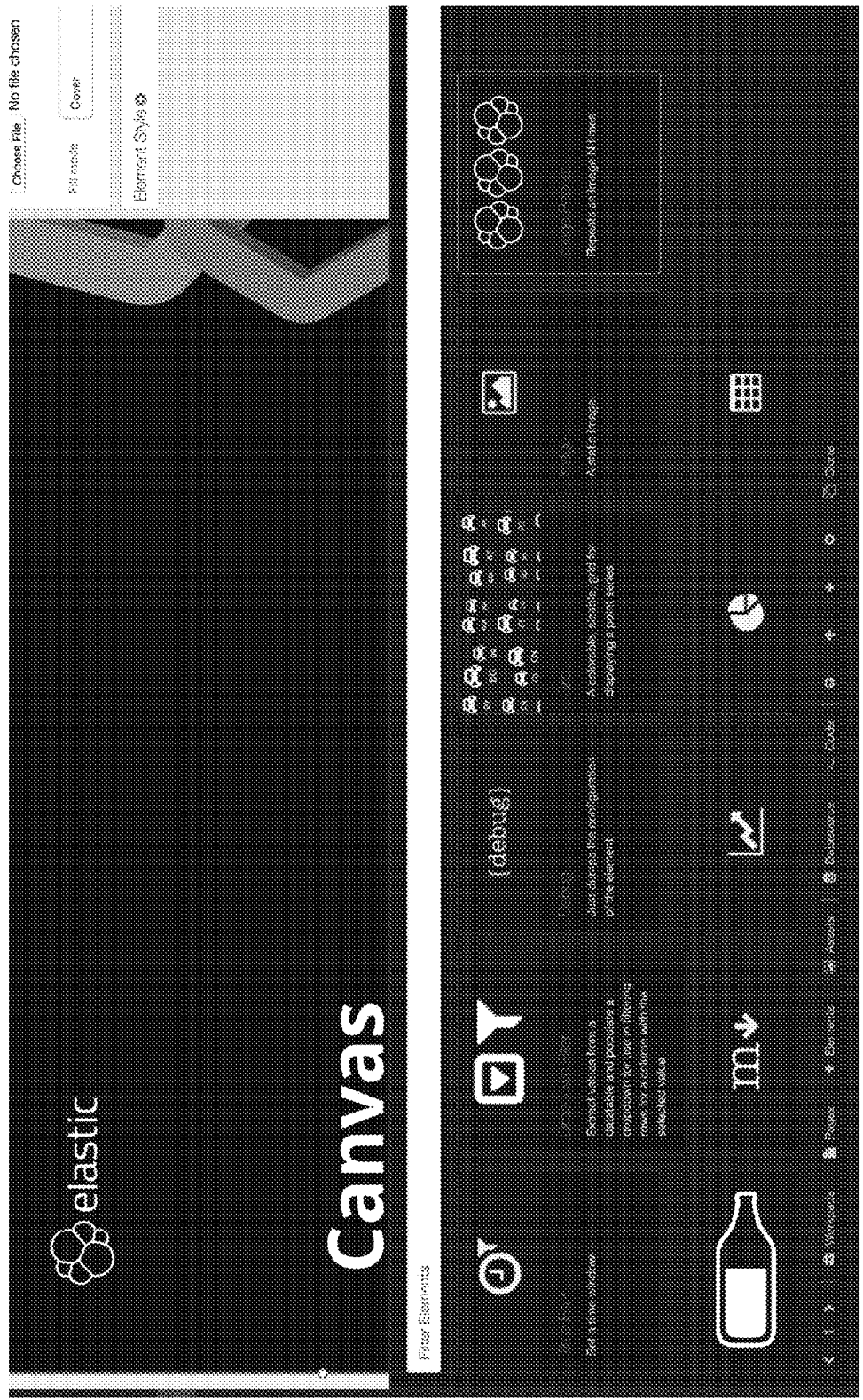
Figure 2J:
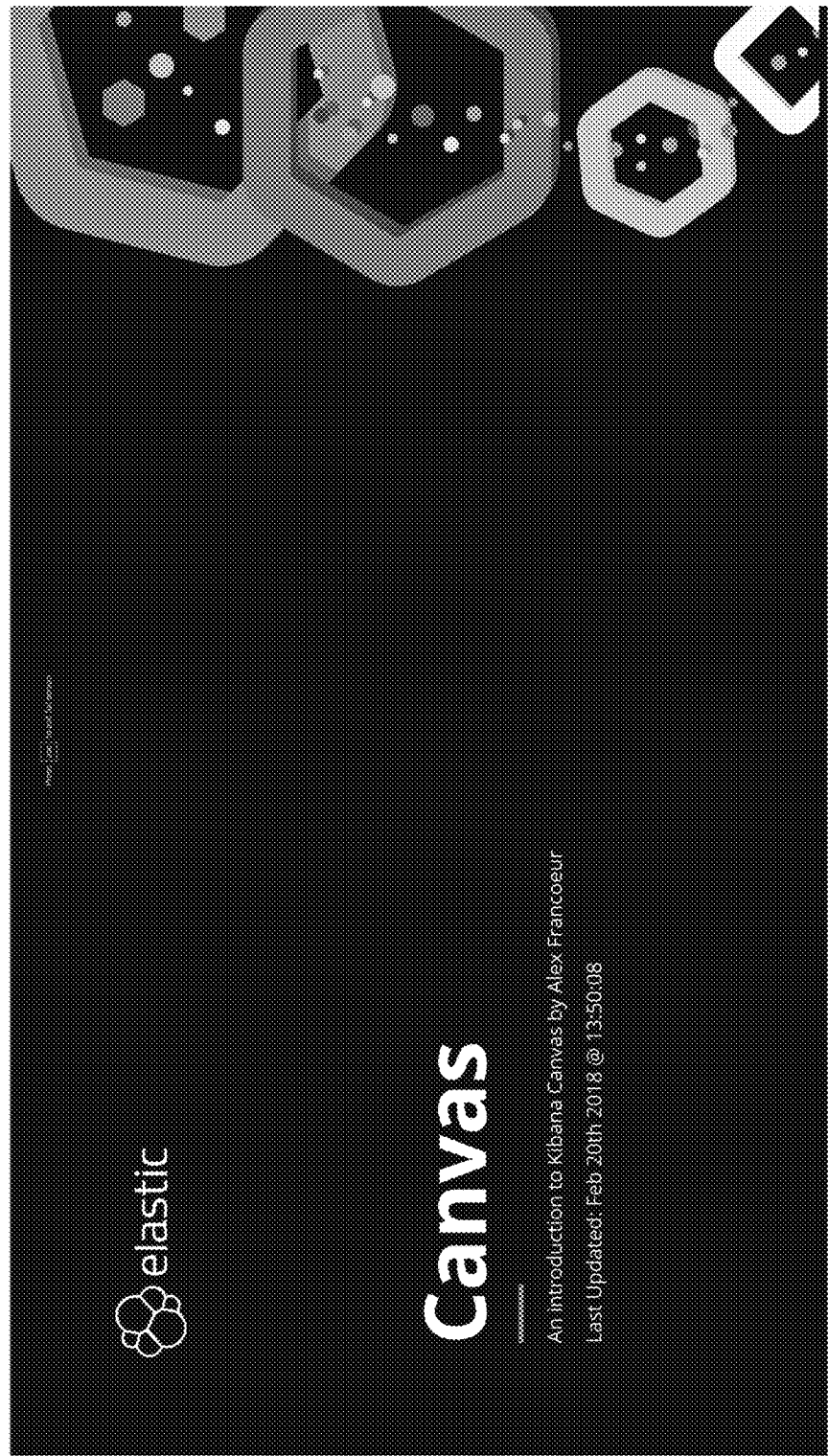
Figure 2K:
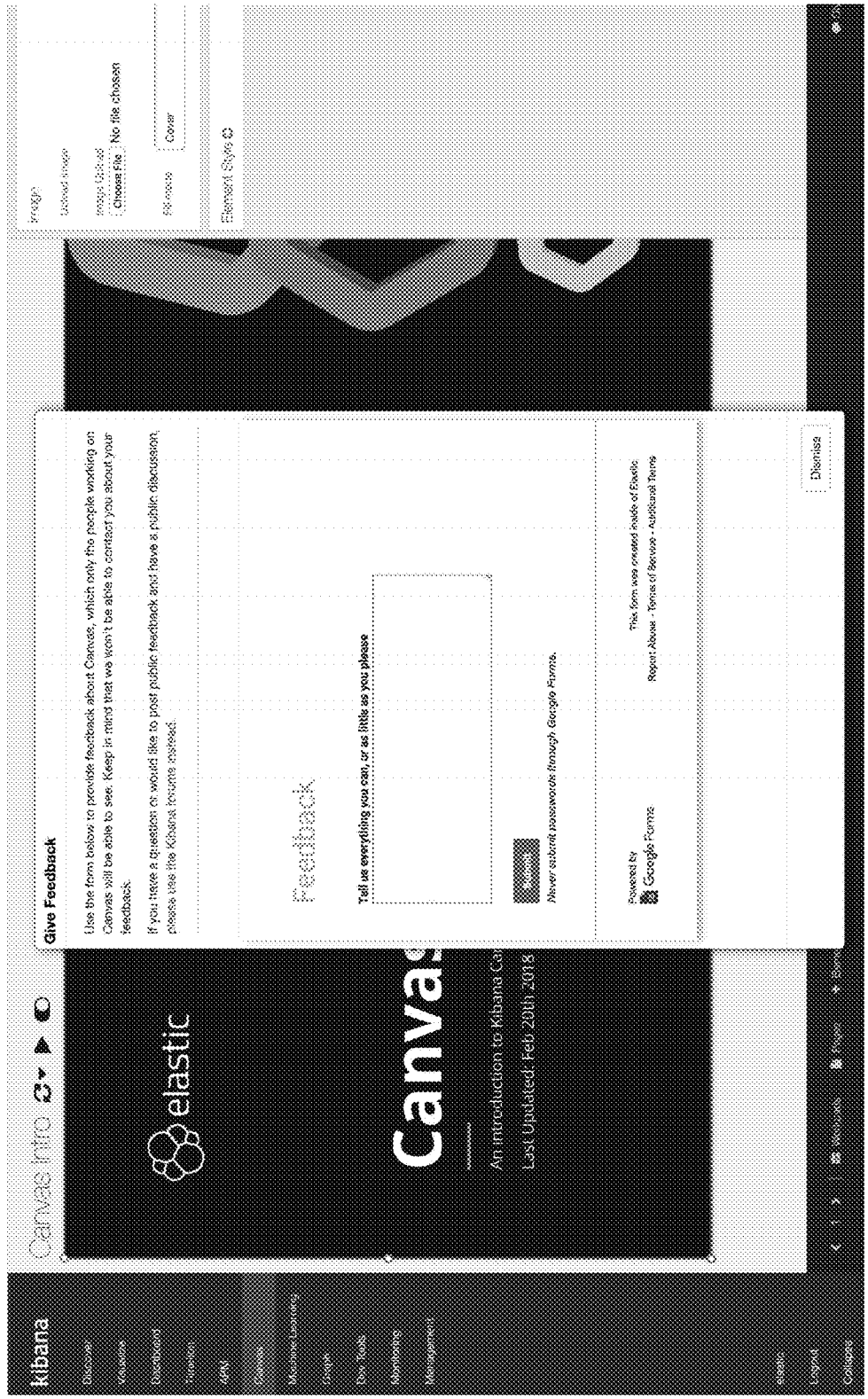
Figure 2L:
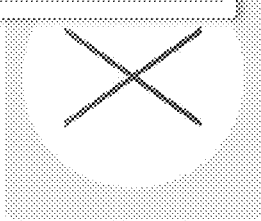
Figure 2M:
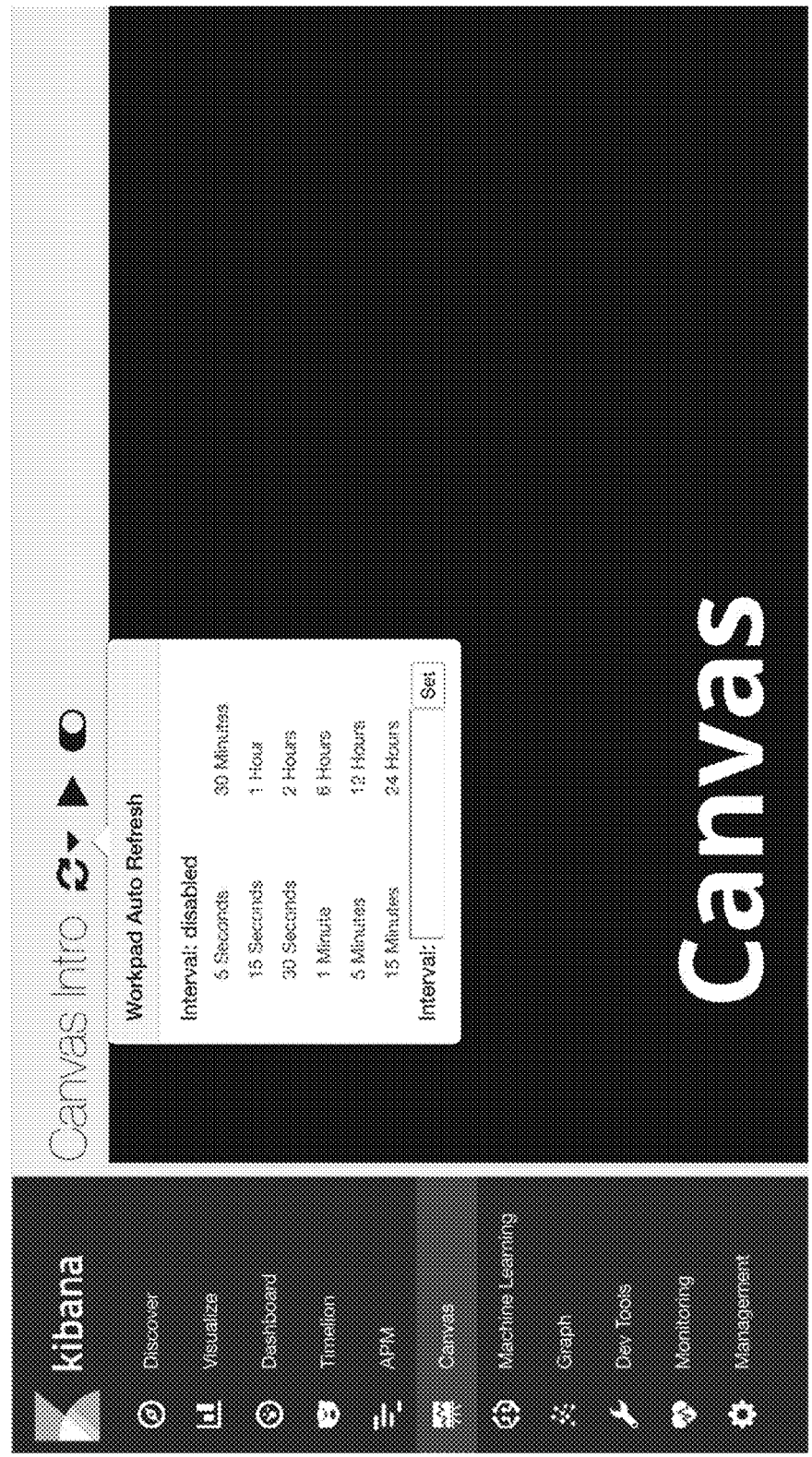
Figure 2N:
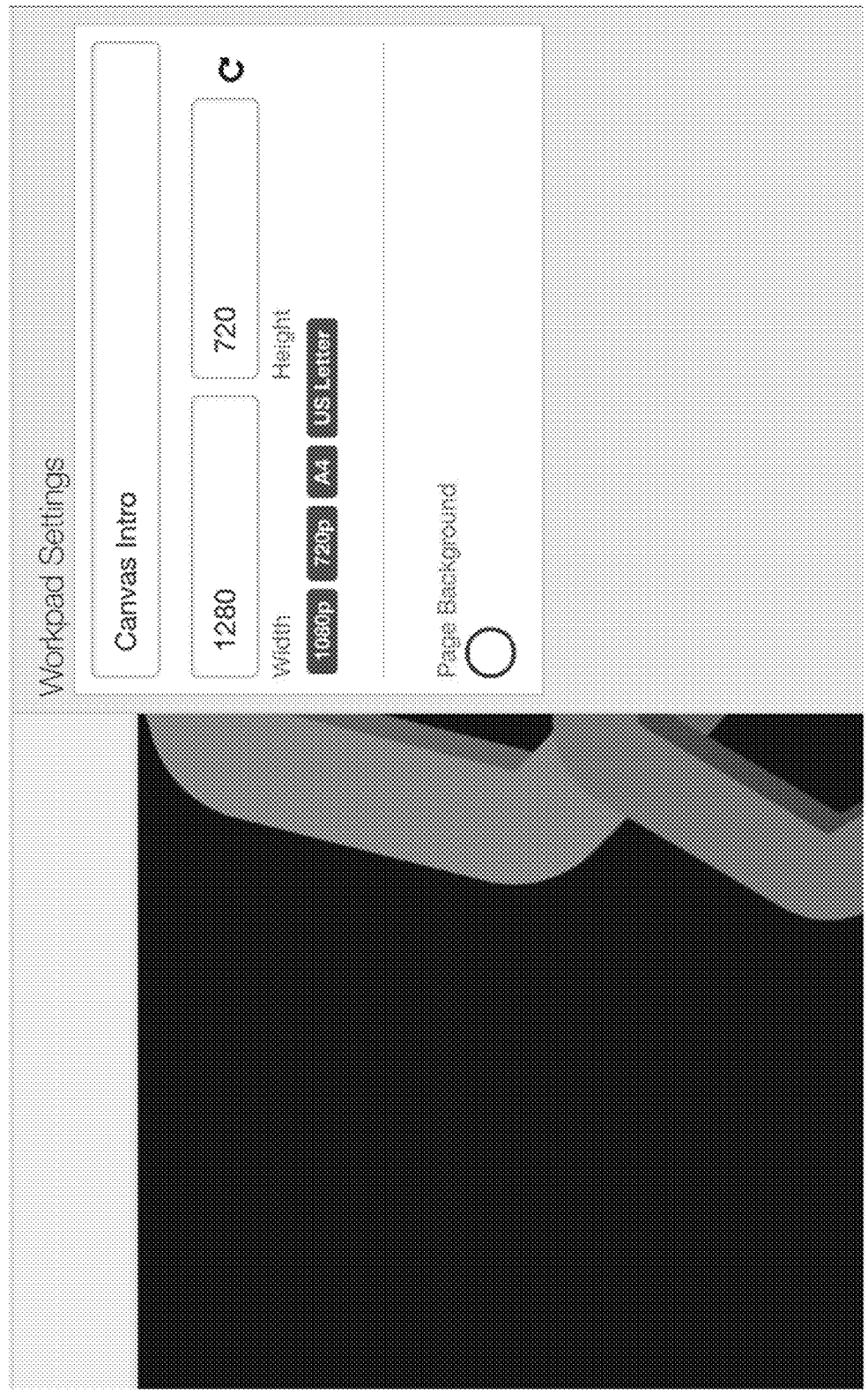
Figure 20:
Figure 2P:
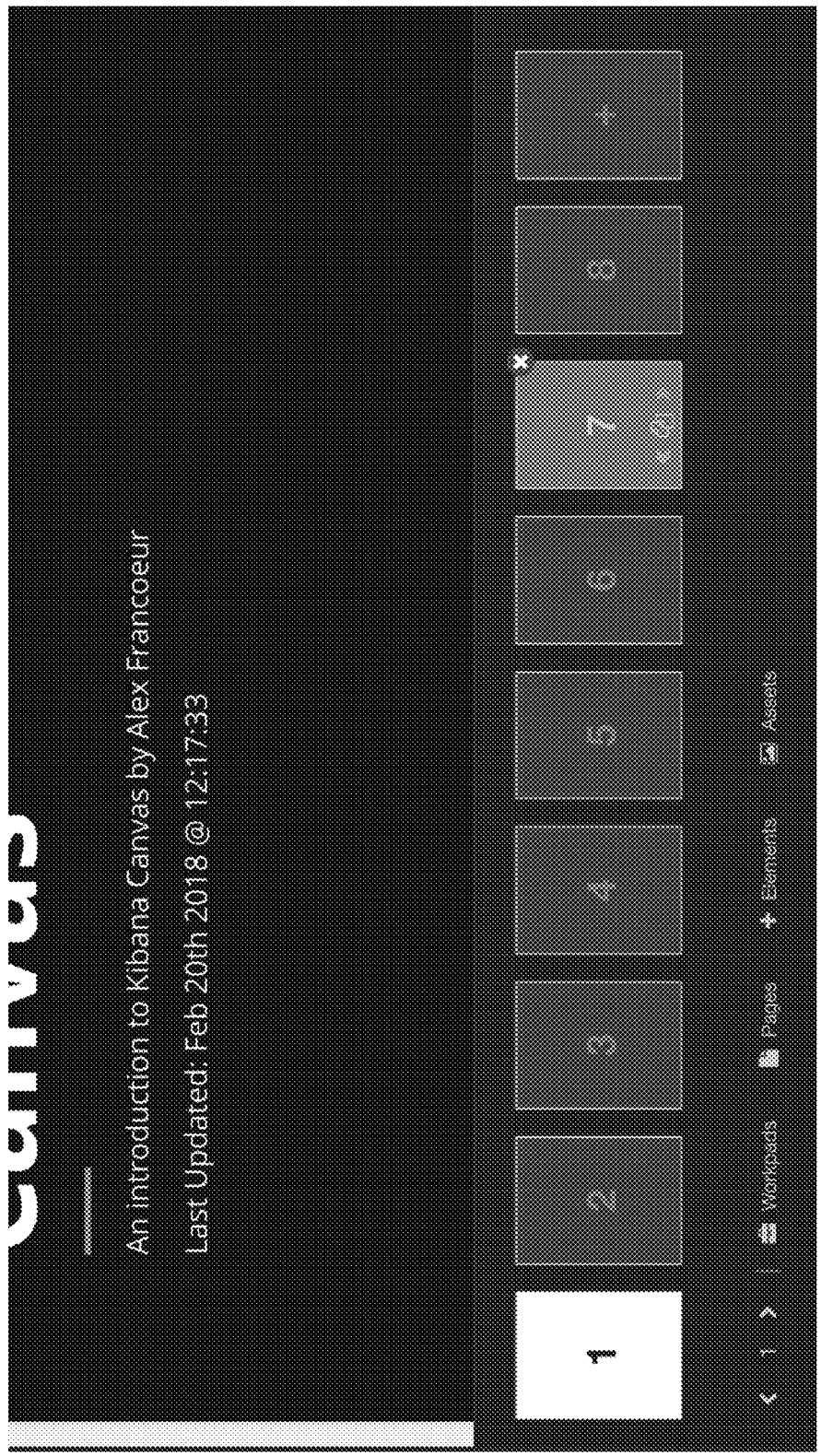
Figure 2Q:
Figure 4A:
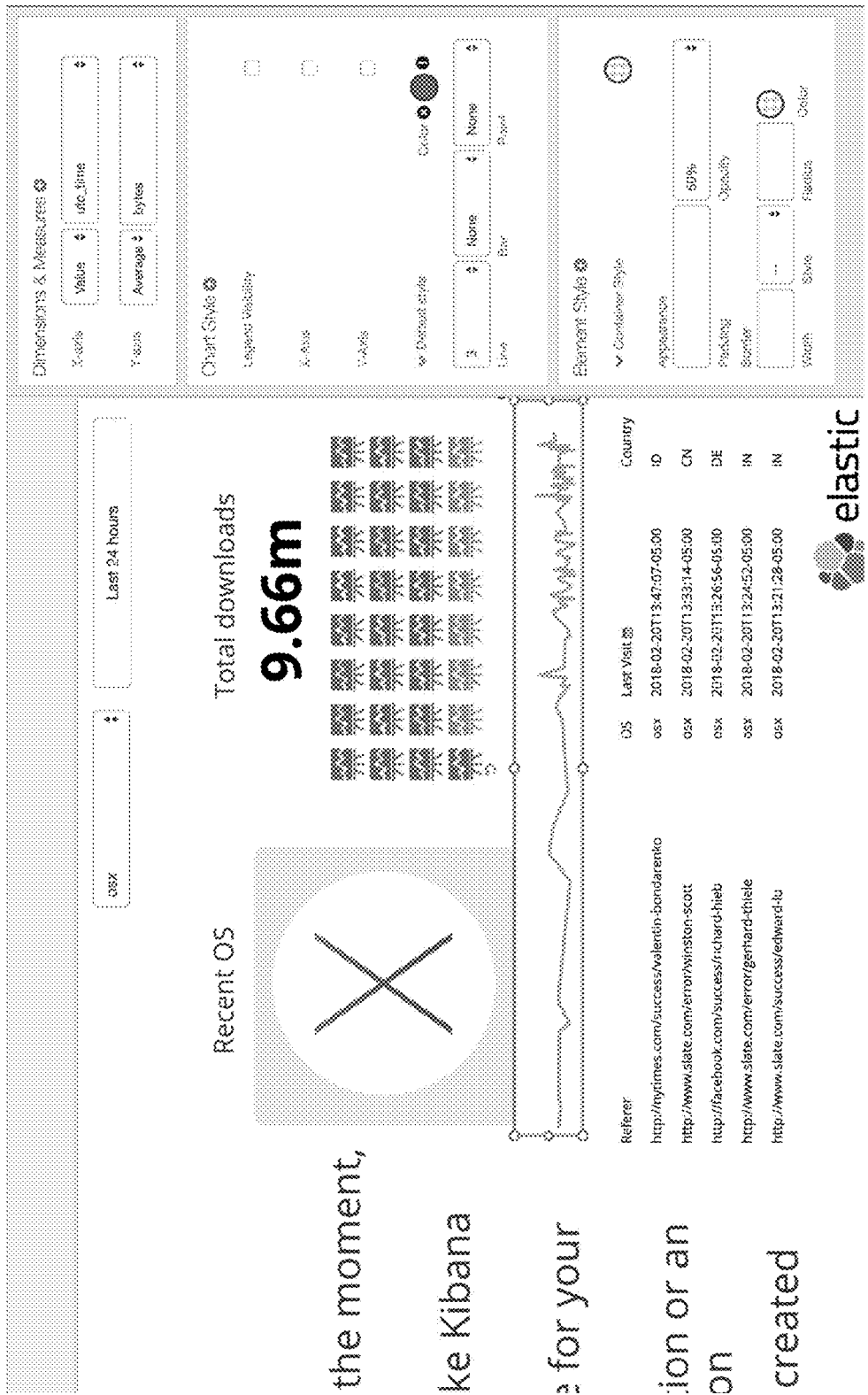
FIGS. 4A-4H show example relationships between graphical user interfaces (GUIs) and expressions, in accordance with various embodiments.
Figure 4B:
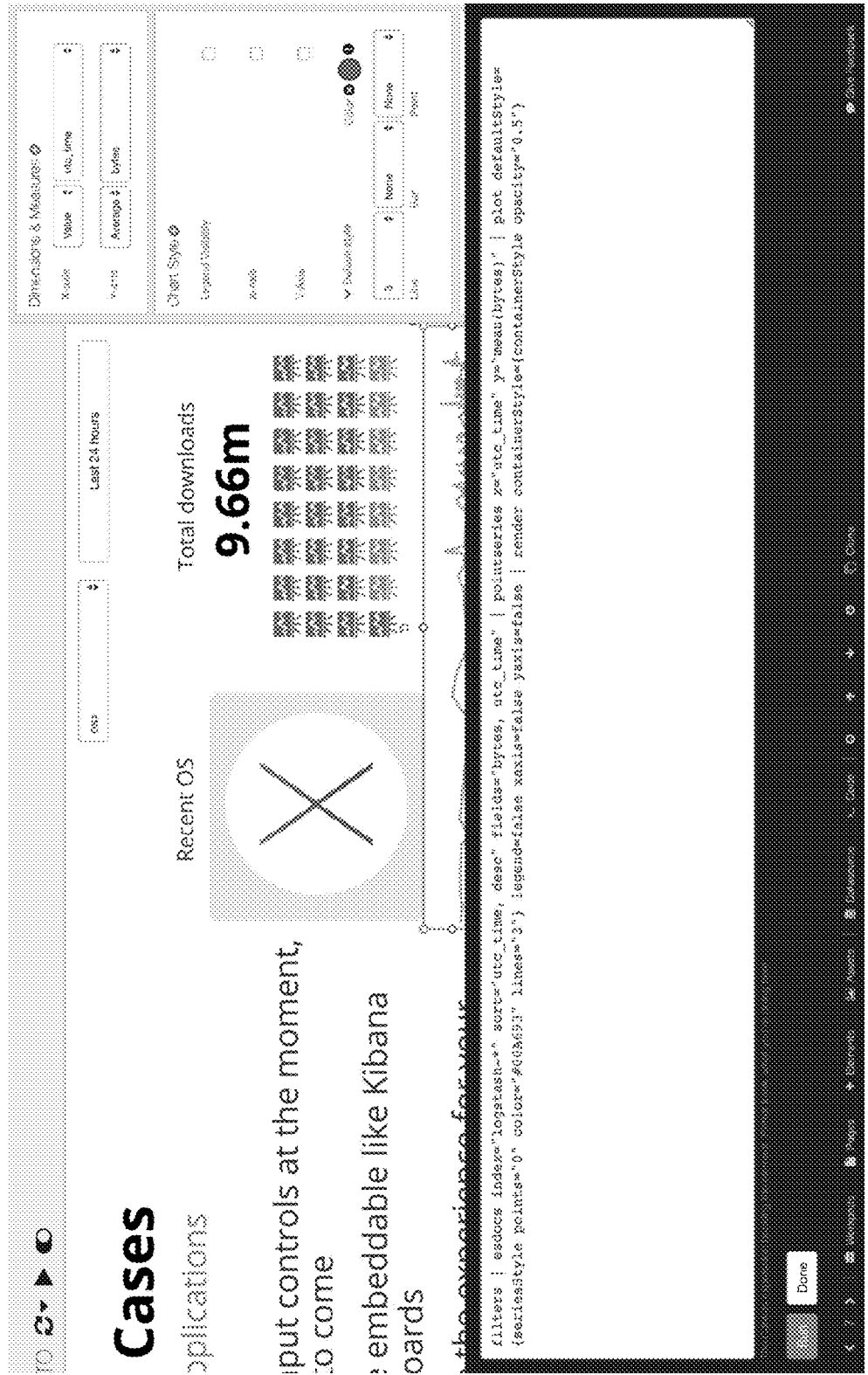
Figure 4C:
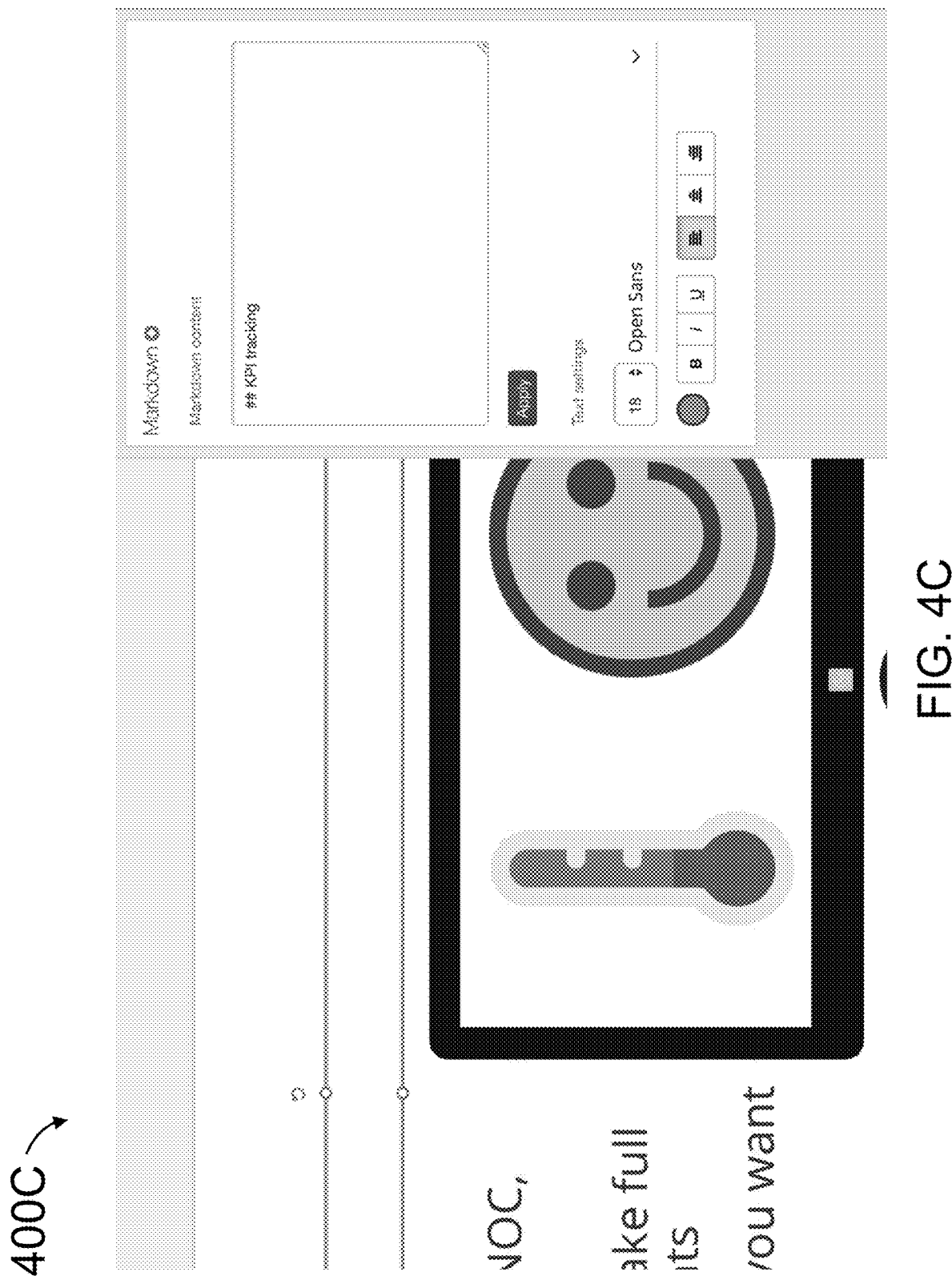
Figure 4D:
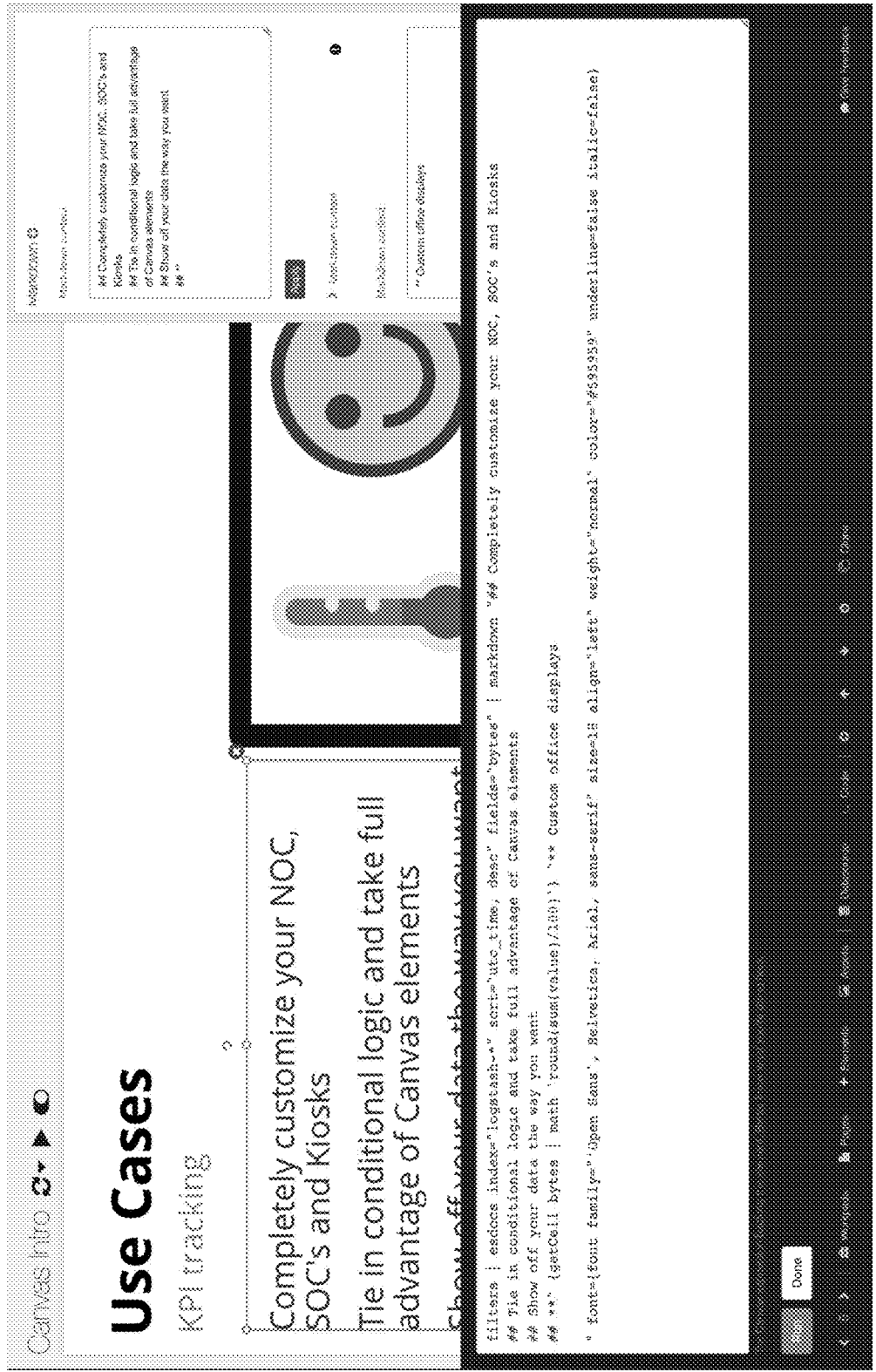
Figure 4E:
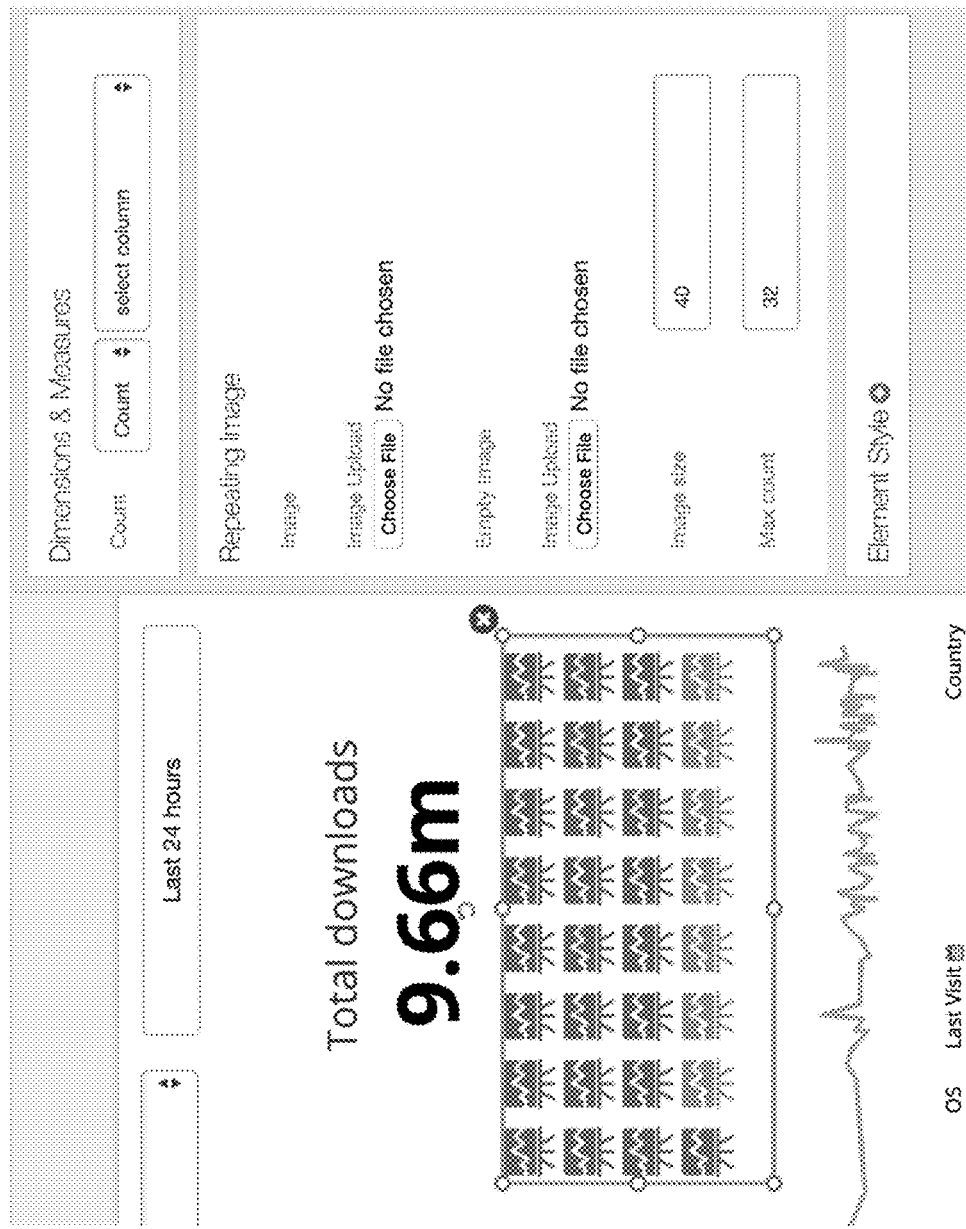
Figure 4F:
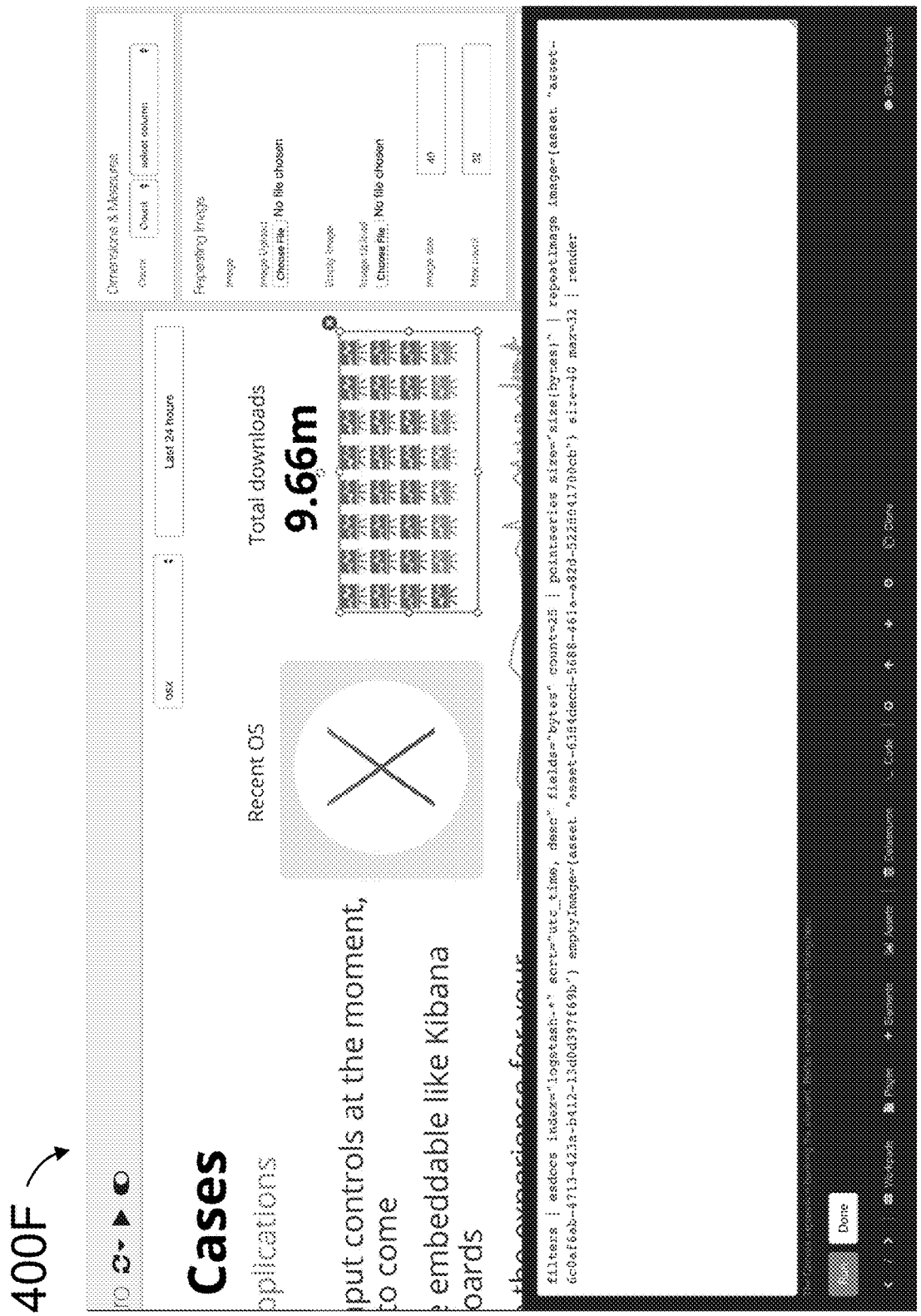
Figure 4G:
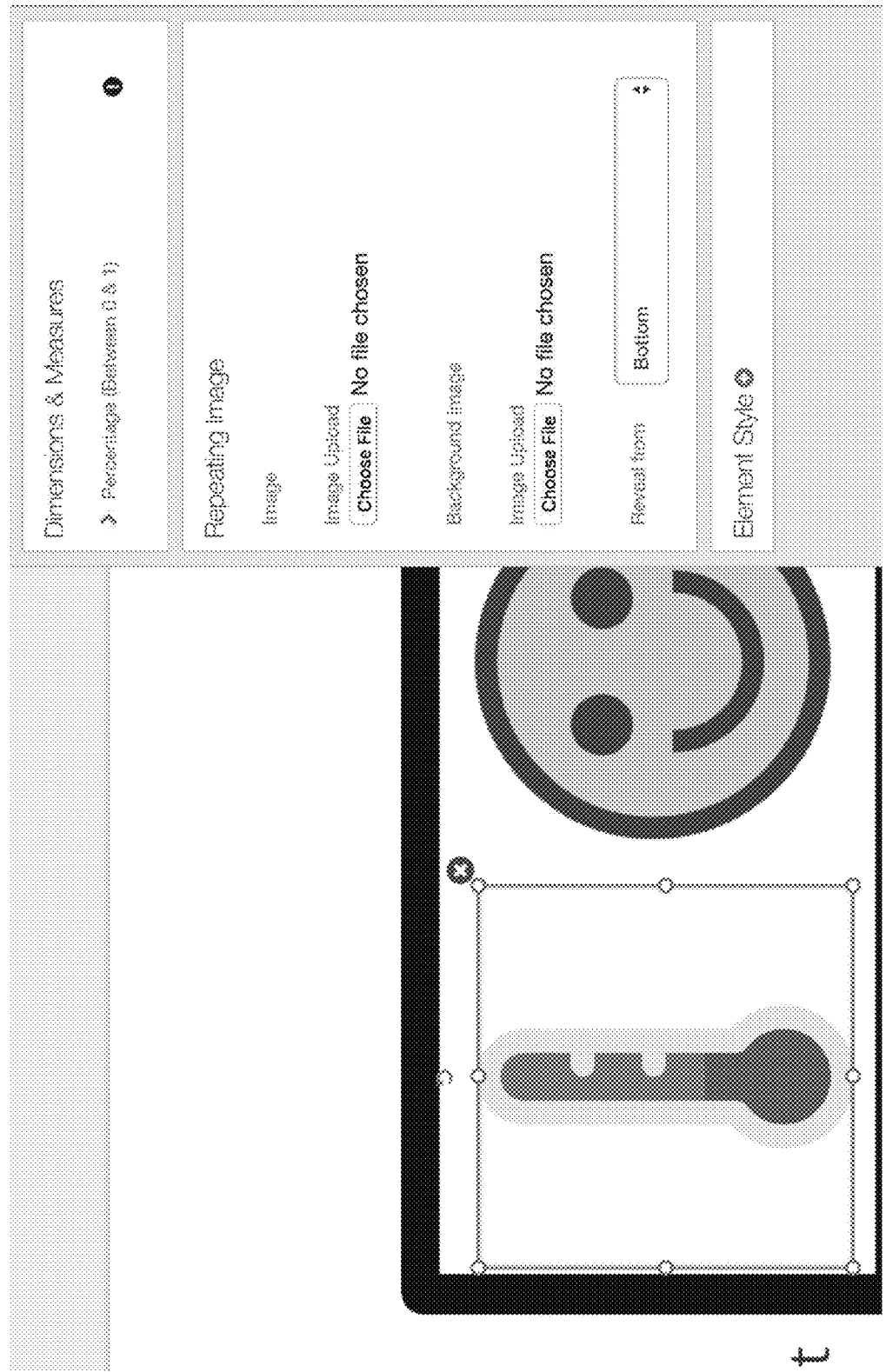
Figure 4H:
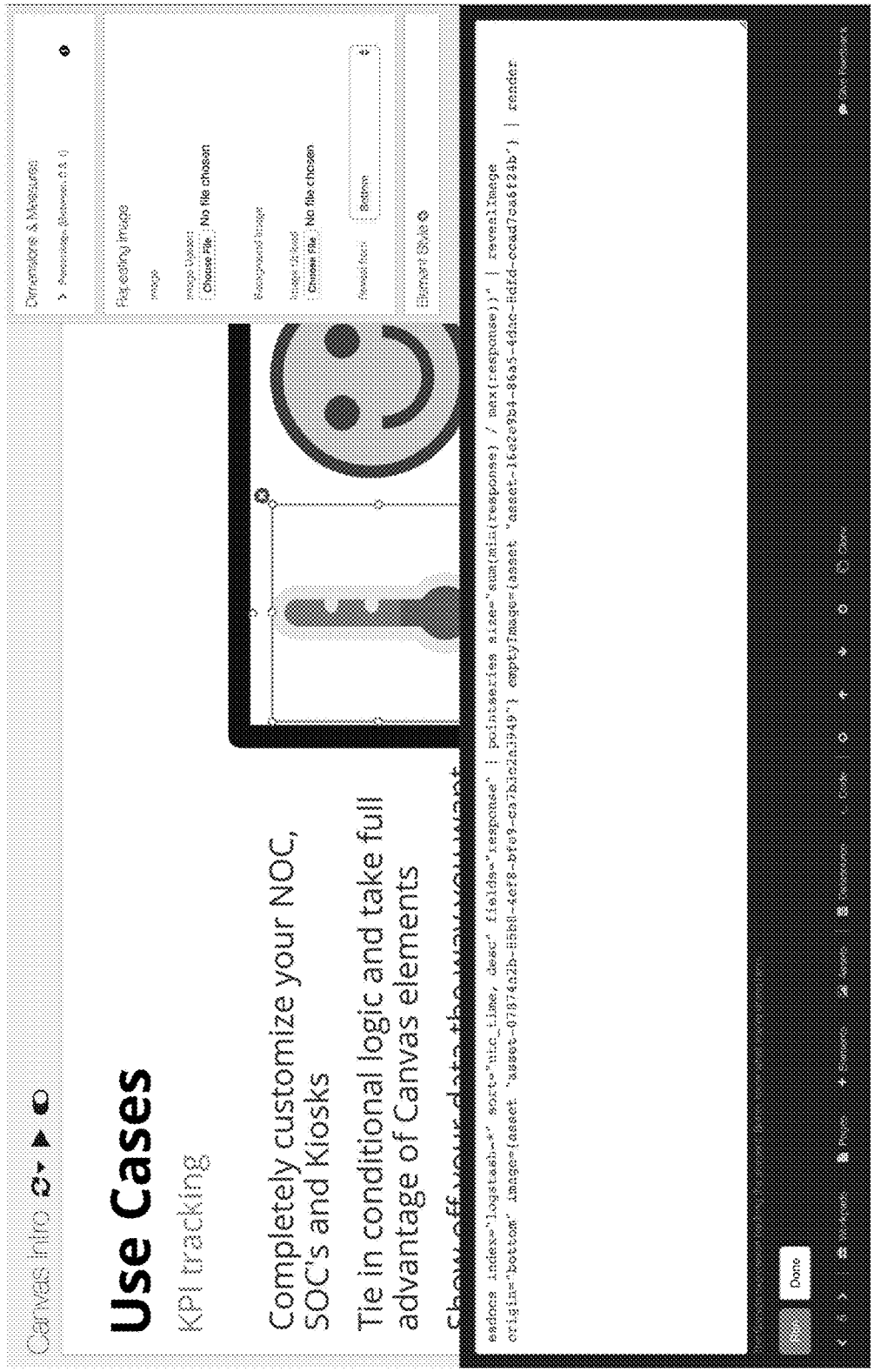

FIGS. 2B-2Q illustrate application 115B-115Q, which are non-limiting examples of application 115 (FIG. 2A) further depicting various embodiments of GUI 116 and components $220_A$-$220_G$. For illustrative purposes, FIGS. 2D-P include enlarged example views of particular features of application 115, wider views of which are shown in FIGS. 2B, 2C, and 2Q. For example, FIGS. 2D-2Q illustrate, among other features, assets and asset management, conditional image expression, data source preview, data source selection, filter drop-down menu, Elasticsearch (e.g., a search engine providing a distributed, multitenant-capable full-text search engine with an HTTP web interface and schema-free JSON documents) data source, element selection, full-screen mode, give feedback, time filter, workpad (e.g., space 210 in FIG. 2A) auto refresh, workpad configuration, workpad management, workpad pages, and workpad view mode.

FIG. 3 shows a non-limiting example, expression 300, of an expression. Each component of components $220_A$-$220_G$ (FIG. 2A) has a corresponding expression. Initially, when a component of components $220_A$-$220_G$ is created (e.g., using GUI 116 in FIG. 1), a corresponding expression is produced. The expression embodies characteristics of the component, such as a style, a data source (e.g., server 130 (FIG. 1)) from which data for the component is drawn, and the like.

For the purposes of illustration, expression 300 is divided into parts 310-350. Expressions can include a pipe-based syntax, where output from one of parts 310-340 flows to the next one of parts 320-350, respectively. A pipe is denoted by "|", which for illustrative purposes separates parts 310-350. Other symbols/character may be used to denote a pipe.

An expression can be an instruction in plain text run by interpreters 117 and 137 (FIG. 1). According to various embodiments, expressions include a function(s). Expressions can be processed anywhere an interpreter of interpreters 117 and 137 can operate, such as by whichever interpreters 117 and 137 is convenient (e.g., more efficient, faster, etc.). Functions can have a context of "client" (browser), "server", and "common" (e.g., the function will be available on both the client and server). Most functions can be common, an exception being where avoiding problems introduced by running in the client (e.g., dealing with Cross-Origin Resource Sharing (CORS)) when making API calls, talking to a database, etc.) or on the server (e.g., using browser APIs, like geolocation, asking the user for input, etc.) would be advantageous. CORS is a mechanism that uses additional HTTP headers to let a user agent gain permission to access selected resources from a server on a different origin (domain) than the site currently in use.

For example, when data used by a component is not stored in client 110 and is available from server 130 (FIG. 1), then a portion of the expression associated with getting data (or a data source, e.g., part 310 of expression 300) is run by interpreter 137. By way of further non-limiting example, when data used by a component is cached in (or otherwise available from) client 110, then a portion of the expression (e.g., part 310 of expression 300) is run by interpreter 117.

Retrieving data from server 130 (e.g., interpreter 137 evaluates some of an expression) every time a style of and not data for a component is changed is slow and inefficient, because using a copy of the data cached locally does not require a network request (e.g., going out over communications links 120) which can be slow.

Turning to expression 300, the interpreter (e.g., interpreters 117 and 137) starts at part 310 and looks up what esdocs requires as context, which is usually the output of the previous function. If the function is the first one in the expression, the context is null, unless cast to something else. In part 310, esdocs is the first function in expression 300, so there's no context. The esdocs function can require a context of type query. The interpreter looks at the null value and creates the query type from null, resulting in an object like {type: "query"}.

The interpreter (e.g., interpreters 117 and 137) then looks at the arguments for esdocs. If any of them are a sub-expression, it runs those sub-expressions. In part 310 there are no sub-expressions, just a plain string argument. The interpreter executes esdocs, receiving both context and the resolved values all of its arguments. So, the interpreter gets a query as context, and one argument telling it to retrieve @timestamp and bytes.

The interpreter (e.g., interpreters 117 and 137) continues to part 320 where it executes staticColumn, which creates a new column with a value that is the same for all rows. staticColumn accepts and outputs a datatable. In between "{" and "}" is a sub-expression. The interpreter executes the sub-expression before executing staticColumn. Each sub-expression is passed the same context that will eventually be given to staticColumn: the datatable output by esdocs. So, math accepts a datatable and, in this case, uses it to sum up all the values of a column.

Once the interpreter (e.g., interpreters 117 and 137) has run all of the sub-expressions, it checks the outputs of each and casts them as necessary for the types that each argument has declared it requires. In this case the value argument accepts string, number, null, or boolean. The interpreter executes staticColumn, which outputs a new datatable with a new column called total containing the sum of all values in the bytes column for every row.

The interpreter (e.g., interpreters 117 and 137) proceeds to part 330 where it runs sleep. Sleep can introduce a delay into the running of expression 300. Sleep can also receive and pass on the datatable from part 320.

The interpreter (e.g., interpreters 117 and 137) goes on to part 340 having mapColumns. The interpreter runs partial expression getColumn @timestamp|rounddate 'YYYY-MM-DD' (see 350). MapColumns then gets the resulting output of rounddate and uses the output to do some date rounding. In some embodiments, partial expressions are denoted by the "${" and "}" syntax. Partial functions can be passed into the parent function (whereas sub-expressions can be interpreted inline).

The GUI of application 115 can receive the datatable and determine it does not know what to do with it. The GUI can then passes the datatable back to the interpreter (e.g., interpreters 117 and 137) as context, and with a function of render. This results in the datatable being wrapped with a render object, which tells the GUI to show it as an HTML table.

In some embodiments, changes made to an expression also change the corresponding of components 220$_A$-220$_G$ (FIG. 2A). In this way, the style and/or data in a component of components 220$_A$-220$_G$ can be manipulated in a manner not easily expressed by the GUI.

In some embodiments, changing/updating a characteristic/feature of a component from a user interface (UI), such as a GUI, updates an abstract syntax tree (AST) (described further below), the AST updates the expression. In various embodiments, changing/updating an expression updates an AST, which updates the UI. Various combinations and permutations of sequences of making changes using the GUI and expression are possible. By way of non-limiting example, Expression→AST→UI→Updates via the UI→Updated AST→Updated Expression When the expression changes, it is passed back through the interpreter (e.g., interpreter 117 or 137 in FIG. 1) to produce the updated output. In addition, the application (e.g., application 115) can perform some caching so that it only re-executes the part of the expression that changed, and all the functions that follow it.

Figure 5A:
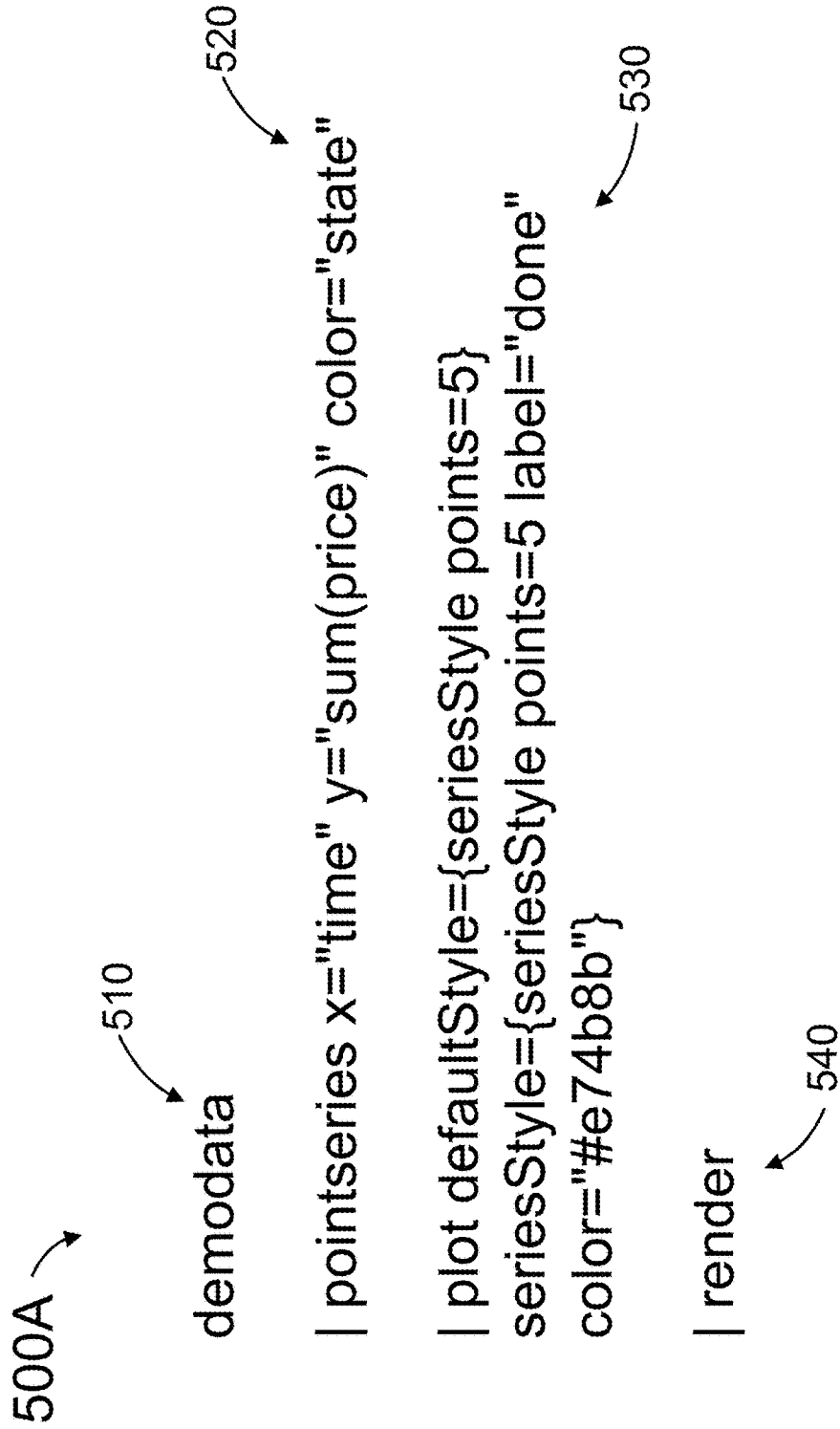
FIG. 5A is an example expression and FIG. 5B is an example (corresponding) GUI, according to some embodiments.

For example in expression 500A in FIG. 5A, when the user uses the UI to change the color, the results of "demodata|pointseries" do not run again, so that context is pulled from a cache of the data and provided to plot directly as context, and rest of the expression (only "render here") is executed normally, getting the context of the function before it. The user can edit the expression directly as well using the "code" section at the bottom. When done this way, then entire expression can be re-run without any caching.

FIGS. 4A-4H illustrate non-limiting examples of relationships/feedback between a GUI and an expression which configure a component. For example, FIGS. 4A and B depict a coordinate plot, FIGS. 4C and D markdown, FIGS. 4E and F repeating image, and FIGS. 4G and H reveal image. For illustrative purposes, FIGS. 4A-H include enlarged example views, wider views of which are shown in FIGS. 2B and C.

FIG. 5A shows a non-limiting example, expression 500A, of an expression. Expression 500A includes parts 510-540. For example, part 530 informs the plot function how to format the series "done," in this example, drawing the value as points with the color #e74b8b.

Figure 5B:
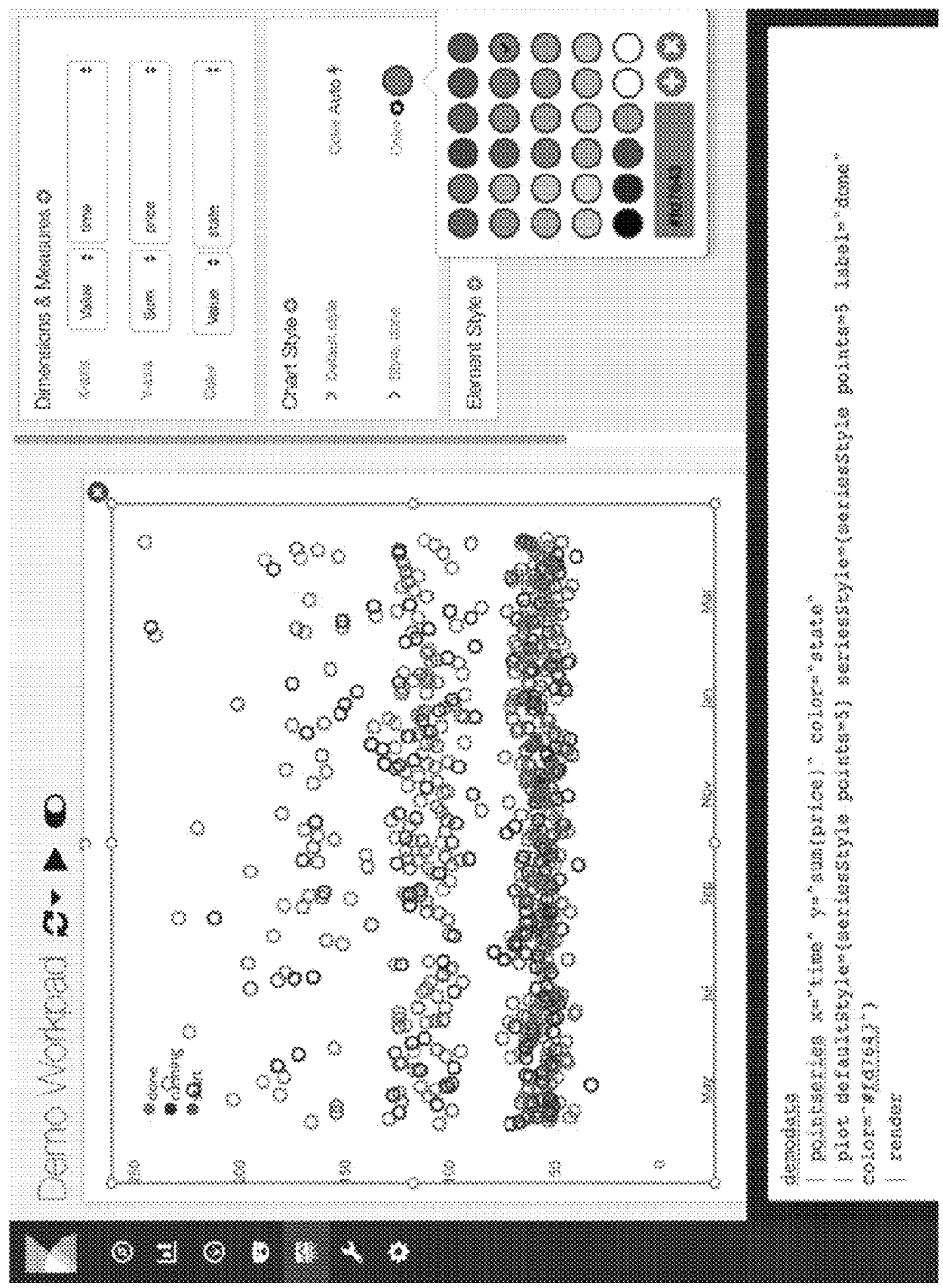

A user can change the color using a GUI by selecting a different color, or by changing the value directly in the expression. FIG. 5B depicts application 115 (FIGS. 1 and 2A-Q) in which a color (e.g., orange) was selected/indicated (e.g., via a mouse click), the expression was updated to use the color #fd7643, and the visualization was re-rendered using the updated color.

Figure 6:
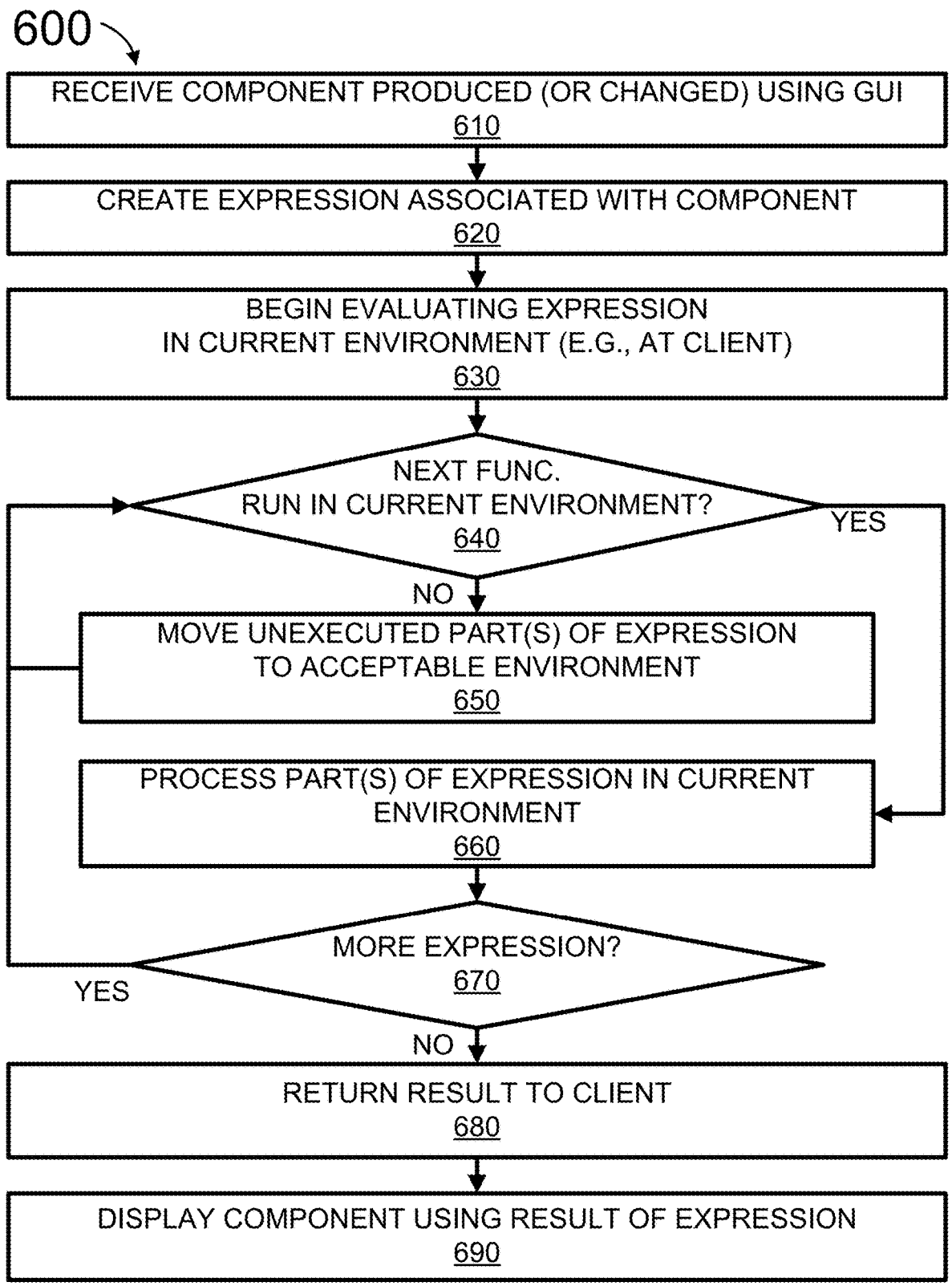
FIG. 6 is simplified flow diagram of a method for instantiating a component, according to various embodiments.

FIG. 6 show method 600 for instantiating a component according to some embodiments. Method 600 can be performed by system 100 (and its constituents) as described in relation to FIGS. 1 and 2A-G. Method 600 can commence at step 610, where a component is received (e.g., at a client). For example, a component of components 220$_A$-220$_G$ (FIG. 2A) is received using GUI 116 (FIG. 1). The component can include style characteristics (e.g., size, location, orientation, font, font color, background color, border, etc.) and a data source (e.g., default data stored in computing device 100, data stored in server 130 (FIG. 1), etc.).

At step 620, an expression describing (corresponding to) the component can be created (e.g., at the client). For example, the expression can have at least some of the characteristics of expressions described in relation to FIG. 3.

At step 630, the expression can begin to be evaluated (e.g., at the client). For example, interpreter 117 (FIG. 1) can start executing the expression, such as was described in relation to FIG. 3.

At step 640, a determination is made whether the next function in the expression can run in the current environment (e.g., client, server, other environment). In some embodiments, the determination is whether the function for retrieving or processing data is available locally or in another environment. When the next function in the expression cannot run in the current environment, method 600 can proceed to step 650. When the next function in the expression can run in the current environment, method 600 can continue to step 660. In some embodiments, step 640 is performed by interpreter 117, such as when the current environment is the client.

At step 650 the unexecuted parts of the expression, including the next function, can be moved to an acceptable environment. For example, when the current environment is a client and the acceptable environment is a server, an interpreter is spun up on a server to process the unexecuted parts of the expression including the next function.

In some embodiments, the interpreter is interpreter 137 (FIG. 1). For example, a network socket in server 130 is listening/waiting for execution of the expression to move from client 110 to server 130 (FIG. 1) and server 130 launches interpreter 137 when initiated by (client) application 115. A network socket can be an internal endpoint for sending or receiving data at a single node (e.g., server 130) in a computer network (e.g., communications links 120). A network socket can represent the endpoint in networking software (e.g., a protocol stack), such as an entry in a table (e.g., including communication protocol, destination, status, etc.).

At step 660, the unexecuted parts of the expression can be processed in the current environment (e.g., client, server, and the like) by the interpreter (e.g., interpreters 117 and 137 in FIG. 1). In some embodiments, the interpreter (in the current environment) tries to evaluate (all) the remaining (unexecuted) parts of the expression. For example, the interpreter (in the current environment) will process the remaining parts of the expression until it encounters a function that cannot be run in the current environment (at which point an evaluation such as at step 640 can be performed).

At step 670, a determination is made whether there are further parts of the expression to execute (e.g., there are unexecuted parts of the expression). When there is more of the expression to run, method 600 can proceed to step 640. When there is no more of the expression to run, method 600 can continue to step 680. In some embodiments, step 640 is performed by interpreter 137, such as when the current environment is the server.

At step 680, the result(s) from the processing at step 660 can be returned to the client. For example, server 130 sends the retrieved data to client 110, where it can be stored (cached).

At step 690, the component can be rendered/displayed on the client. For example, GUI 116 (FIG. 1) can display a component of components 220$_A$-220$_G$ in space 210 (FIG. 2A) using the results from the executed expression.

Figure 7:
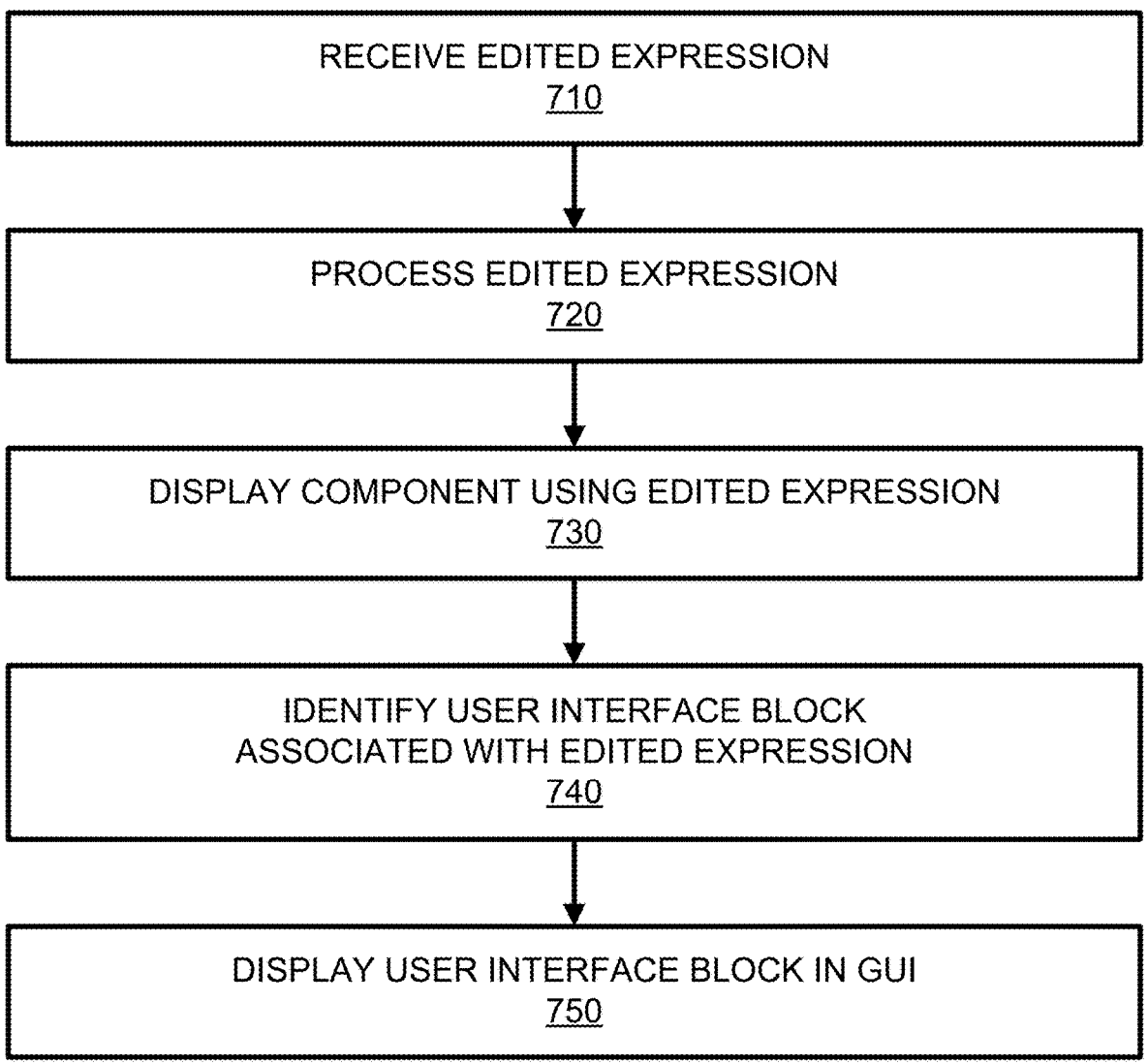
FIG. 7 is a simplified flow diagram of a method for iterating between a graphical user interface and an expression for data visualization, in accordance with some embodiments

FIG. 7 shows method 700 for iterating between a graphical user interface and an expression for a component, in accordance with some embodiments. Method 700 can be performed by system 100 (and its constituents) as described in relation the FIGS. 1 and 2A-G. Additionally, method 700 may be performed after method 600 (FIG. 6) is performed.

Method 700 can commence at step 710, where an edited expression is received (e.g., at a client from a user). For example, a user can edit the text of the expression to change the component, such as data and/or data source used, content type (e.g., text, image, chart, etc.), type or plot/chart, color, font, and the like.

At step 720, the edited expression is executed by an interpreter. For example, interpreter 117 and/or interpreter 137 (FIG. 1) can run all or portions of the expression, such as described in relation to FIG. 6.

At step 730, the component can be rendered/displayed. For example, GUI 116 (FIG. 1) can display a component of components 220$_A$-220$_G$ in space 210 (FIG. 2A) using the results from the executed expression.

At step 740, a GUI block associated with the edited expression can be determined. Step 740 is described further in relation to FIG. 8.

At step 750, the determined GUI block is provided (e.g., displayed) to the user by the GUI.

Figure 8:
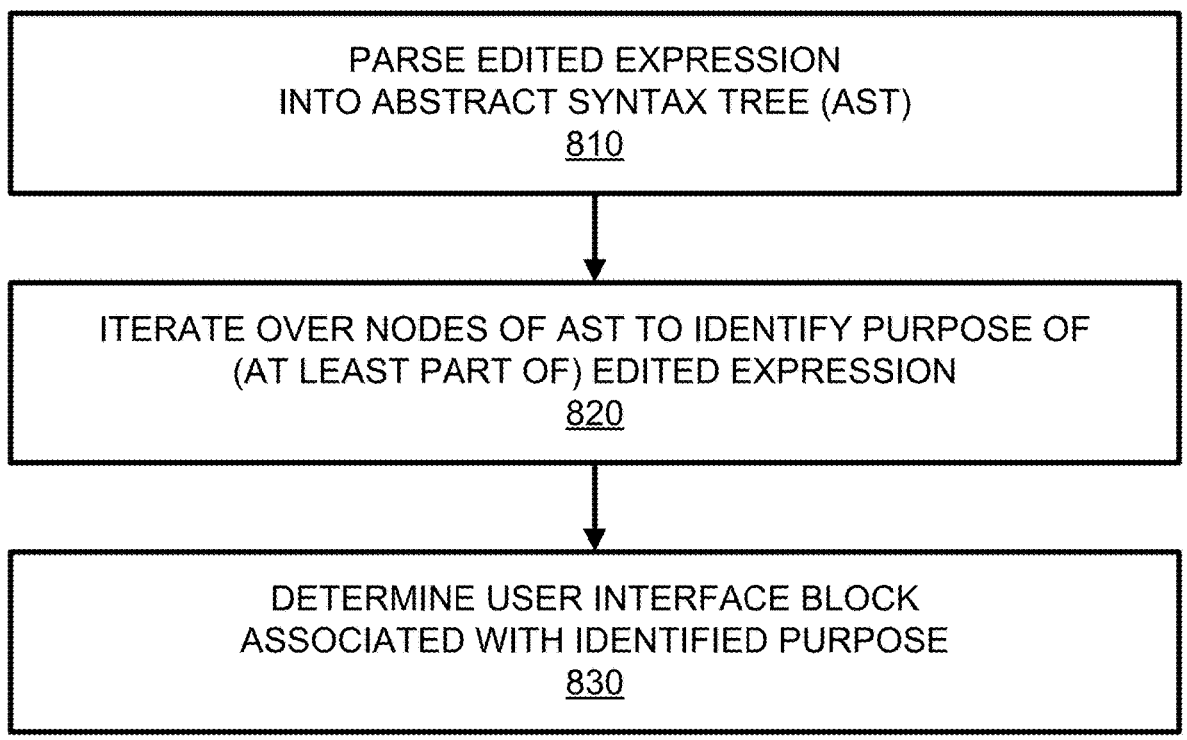
FIG. 8 is simplified flow diagram of a method for determining a user interface block, in accordance with various embodiments.

FIG. 8 is a simplified flow diagram of method 800 for showing iterating between a graphical user interface and an expression for data visualization, according to some embodiments. For the description of FIG. 8, step 740 is referred to as method 740. Method 740 can commence at step 810, where the edited expression can be parsed into an abstract syntax tree (AST). An AST can be a tree representation of the abstract syntactic structure of the expression. Each part/node of the tree can denotes a construct (e.g., function) occurring in the expression. The syntax is referred to as "abstract," because it does not represent every detail appearing in the (actual/real) expression.

At step 820, method 740 can iterate over part of the AST to determine the purpose/concern of the particular parts, such as by checking the function names. In other words, the AST can be thought of as a chain of functions, each one feeding into the next one. The name of the function can indicate the purpose. For example, if the function pertains to data, then the concern of this part/node of the AST is to retrieve data. By way of further non-limiting example, the function can be called point series, which is known to be a data modelling function. By way of additional example, a purpose/concern of a (complex) function is not determined.

The UI (e.g., GUI) can be built by looking for a function name it understands, then looking at that function's arguments. Arguments can be matched to given types. For example, an argument that may be true or false is mapped to a checkbox such that an unchecked box represent false, and a check box would be true.

At step 830, user interface blocks corresponding to the determined purpose/concern of the parts of the AST can be identified. For example, if the concern is to retrieve data, then the determined user interface block enables the user to describe how they want data searched and the like. By way of further non-limiting example, if the purpose is a modelling function, then the user interface block enables the user (depending on the modelling function) to, swap the x-axis and y-axis, and the like. By way of another example, if the concern is a view, then the determined user interface block enables the user to change the font, change the colors, labels, patterns, and the like. By way of additional example, when a purpose/concern of a (complex) function is not (cannot be) determined, the function is ignored and a user interface block for the function is not determined (e.g., the function is ignored and a user interface is not built for the function). In some embodiments, the identified user interface block includes a location of the user interface block in the GUI (e.g., upper right hand side, bottom, etc.).

FIG. 9 illustrates an exemplary computer system (or computing system) 900 that may be used to implement some embodiments of the present invention. The computer system 900 in FIG. 9 may be implemented in the contexts of the likes of computing systems, networks, servers, and combinations thereof. The computer system 900 in FIG. 9 includes processor unit(s) 910 and main memory 920. Main memory 920 stores, in part, instructions and data for execution by processor unit(s) 910. Main memory 920 stores the executable code when in operation. In some embodiments, main memory 920 includes various combinations and permutations of dynamic random-access memory (DRAM) and static random-access memory (SRAM).

The computer system 900 in FIG. 9 further includes a mass data storage 930, portable storage device 940, output devices 950, user input devices 960, a graphics display system 970, and peripheral device(s) 980.

The components shown in FIG. 9 are depicted as being connected via a single bus 990. The components may be connected through one or more data transport means. Processor unit(s) 910 and main memory 920 are connected via a local microprocessor bus 990, and the mass data storage 930, peripheral device(s) 980, portable storage device 940, and graphics display system 970 are connected via one or more input/output (I/O) buses.

Mass data storage 930, which can be implemented with a magnetic disk drive, solid state drive, or an optical disk drive, is a non-volatile storage device for storing data and instructions for use by processor unit(s) 910. Mass data storage 930 stores the system software for implementing embodiments of the present disclosure for purposes of loading that software into main memory 920.

Portable storage device 940 operates in conjunction with a portable non-volatile storage medium, such as a flash drive, floppy disk, compact disk, digital video disc, or Universal Serial Bus (USB) storage device, to input and output data and code to and from the computer system 900 in FIG. 9. The system software for implementing embodiments of the present disclosure is stored on such a portable medium and input to the computer system 900 via the portable storage device 940.

User input devices 960 can provide a portion of a user interface. User input devices 960 may include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 as shown in FIG. 9 includes output devices 950. Suitable output devices 950 include speakers, printers, network interfaces, and monitors.

Graphics display system 970 include a liquid crystal display (LCD) or other suitable display device. Graphics display system 970 is configurable to receive textual and graphical information and processes the information for output to the display device.

Peripheral device(s) 980 may include any type of computer support device to add additional functionality to the computer system.

The components provided in the computer system 900 in FIG. 9 are those typically found in computer systems that may be suitable for use with embodiments of the present disclosure and are intended to represent a broad category of such computer components that are well known in the art. Thus, the computer system 900 in FIG. 9 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 900 may be implemented as a cloud-based computing environment, such as a virtual machine and/or container operating within a computing cloud. In other embodiments, the computing system 900 may itself include a cloud-based computing environment, where the functionalities of the computing system 900 are executed in a distributed fashion. Thus, the computing system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of wired and/or wireless network, including a (wireless) local area network (LAN/WLAN) or a (wireless) wide area network (WAN/WWAN), or the connection may be made to an external computer (for example, through the Internet using an Internet Service Provider, wireless Internet provider, and the like).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for iterating between a graphical user interface and an expression for data visualization comprising:
   receiving, by a client processor, an edited expression from a user, the edited expression including changes to a previously created expression, the previously created expression being associated with a client component, wherein the previously created expression has an associated previous abstract syntax tree (previous AST), _wherein the changes in the edited expression include changes to style characteristics of the client component including changes to the size and the location of the client component, wherein the component operates as part of a GUI, and wherein the component is selected from a menu by the user;
   evaluating, by the processor, the edited expression, the evaluating including:
      evaluating a first portion of the edited expression by a first interpreter, the first interpreter being configured to obtain data from a data source not stored locally on the client component in order to evaluate the first portion of the edited expression;
      evaluating a second portion of the edited expression by a second interpreter, the second interpreter being configured to obtain data from that is cached on the client component in order to evaluate the second portion of the edited expression;

displaying, by the client processor, the client component using the evaluation of the edited expression;

determining, by the client processor, a user interface block using the edited expression, the determining comprising:

parsing the edited expression into an abstract syntax tree (AST), such that each node of a plurality of nodes of the AST denotes a function occurring in the edited expression;

determining a purpose from a plurality of parts of the AST based on a chain of function names occurring in the edited expression; and determining a user interface block based on the determined purpose; wherein the determined user interface block includes a particular location of the user interface block in the graphical user interface; and presenting, by the processor, the user interface block to the user in the graphical user interface, wherein only the AST nodes that have changed from the previous AST nodes are processed.

2. The method of claim 1, further comprising:

receiving, by the processor, the client component specified from the user, the user using the graphical user interface;

creating, by the processor, a corresponding expression for the client component, the creating producing the previously created expression;

evaluating, by the processor, the previously created expression; and displaying, by the processor, the client component using the evaluating the previously created expression.

3. The method of claim 1, wherein determining the user interface block further includes:

ignoring a node of the plurality of nodes of the AST when a purpose for the node of the plurality of nodes is not established.

4. The method of claim 1, wherein the edited expression is in plain text.

5. The method of claim 4, wherein the edited expression uses a pipe-based syntax and is divided into a plurality of parts, such that an output from a first part of the plurality of parts is an input to a second part of the plurality of parts.

6. The method of claim 5, wherein a third part of the plurality of parts includes a first function and a sub-expression, the sub-expression including a second function, the second function being processed before the first function.

7. The method of claim 1, wherein the edited expression further comprises changes at least one of a data source, function, and component type.

8. A system for iterating between a graphical user interface and an expression for data visualization comprising:

a client processor; and a memory communicatively coupled to the client processor, the memory storing instruction executable by the client processor to perform a method comprising:

receiving, by the client processor, an edited expression from a user, the edited expression including changes to a previously created expression, the previously created expression being associated with a client component, wherein the previously created expression has an associated previous abstract syntax tree (previous AST), wherein the changes in the edited expression include changes to style characteristics of the client component including changes to the size and the location of the client component, wherein the component operates as part of a GUI, and wherein the component is selected from a menu by the user;

evaluating the edited expression, the evaluating including:

evaluating a first portion of the edited expression by a first interpreter, the first interpreter being configured to obtain data from a data source not stored locally on the client component in order to evaluate the first portion of the edited expression;

evaluating a second portion of the edited expression by a first second interpreter, the second interpreter being configured to obtain data from that is cached on the client component in order to evaluate the second portion of the edited expression;

displaying the client component using the evaluation of the edited expression;

determining a user interface block using the edited expression, the determining comprising:

parsing the edited expression into an abstract syntax tree (AST), such that each node of a plurality of nodes of the AST denotes a function occurring in the edited expression;

determining a purpose from a plurality of parts of the AST based on a chain of function names occurring in the edited expression; and determining a user interface block based on the determined purpose; wherein the determined user interface block includes a particular location of the user interface block in the graphical user interface; and presenting the user interface block to the user in the graphical user interface, wherein only the AST nodes that have changed from the previous AST nodes are processed.

9. The system of claim 8, wherein the method further comprises:

receiving the client component specified from the user, the user using the graphical user interface;

creating a corresponding expression for the client component, the creating producing the previously created expression;

evaluating the previously created expression; and displaying the user component using the evaluating the previously created expression.

10. The system of claim 8, wherein determining the user interface block further includes:

ignoring a node of the plurality of nodes of the AST when a purpose for the node of the plurality of nodes is not established.

11. The system of claim 8, wherein the edited expression is in plain text.

12. The system of claim 11, wherein the edited expression uses a pipe-based syntax and is divided into a plurality of parts, such that an output from a first part of the plurality of parts is an input to a second part of the plurality of parts.

13. The system of claim 12, wherein a third part of the plurality of parts includes a first function and a sub-expression, the sub-expression including a second function, the second function being processed before the first function.

14. A system for iterating between a graphical user interface and an expression for data visualization comprising:

means for receiving an edited expression from a user, the edited expression including changes to a previously created expression, the previously created expression being associated with a user component, wherein the previously created expression has an associated previous abstract syntax tree (previous AST), wherein the changes in the edited expression include changes to style characteristics of the user component including changes to the size and the location of the user component, wherein the component operates as part of a GUI, and wherein the component is selected from a menu by the user;

means for evaluating the edited expression, the evaluating including:

evaluating a first portion of the edited expression by a first interpreter, the first interpreter being configured to obtain data from a data source not stored locally on the client component in order to evaluate the first portion of the edited expression;

evaluating a second portion of the edited expression by a second interpreter, the second interpreter being configured to obtain data from that is cached on the client component in order to evaluate the second portion of the edited expression;

means for displaying the user component using the evaluation of the edited expression;

means for determining a user interface block using the edited expression, the determining comprising:

parsing the edited expression into an abstract syntax tree (AST), such that each node of a plurality of nodes of the AST denotes a function occurring in the edited expression;

determining a purpose from a plurality of parts of the AST based on a chain of function names occurring in the edited expression; and determining a user interface block based on the determined purpose; wherein the determined user interface block includes a particular location of the user interface block in the graphical user interface; and means for presenting the user interface block to the user in the graphical user interface, wherein only the AST nodes that have changed from the previous AST nodes are processed.

* * * * *